United States Patent
Vanderperren et al.

(10) Patent No.: US 7,424,067 B2
(45) Date of Patent: *Sep. 9, 2008

(54) METHODS AND APPARATUS FOR SYNCHRONIZATION OF TRAINING SEQUENCES

(75) Inventors: Yves Vanderperren, Brussels (BE); Wim Dehane, Kessel-Lo (BE)

(73) Assignee: STMicroelectronics N.V., Amsterdam (NL)

( * ) Notice: Subject to any disclaimer, the term of this patent is extended or adjusted under 35 U.S.C. 154(b) by 66 days.

This patent is subject to a terminal disclaimer.

(21) Appl. No.: 10/532,155

(22) PCT Filed: Oct. 21, 2003

(86) PCT No.: PCT/BE03/00178

§ 371 (c)(1),
(2), (4) Date: Apr. 20, 2005

(87) PCT Pub. No.: WO2004/036861

PCT Pub. Date: Apr. 29, 2004

(65) Prior Publication Data

US 2006/0014494 A1    Jan. 19, 2006

Related U.S. Application Data

(63) Continuation-in-part of application No. 10/364,294, filed on Feb. 10, 2003.

(30) Foreign Application Priority Data

Oct. 21, 2002   (EP)   ................... 02079374

(51) Int. Cl.
   *H04L 27/00* (2006.01)

(52) U.S. Cl. .................................... 375/326

(58) Field of Classification Search ................ 375/130, 375/139, 147, 150, 316, 322, 324, 326, 335, 375/340, 343

See application file for complete search history.

(56) References Cited

U.S. PATENT DOCUMENTS 5,293,401 A * 3/1994 Serfaty ................... 375/231
5,602,835 A   2/1997 Seki et al.

(Continued)

FOREIGN PATENT DOCUMENTS

WO       WO 00/77961 A1 * 12/2000

OTHER PUBLICATIONS

U.S. Appl. No. 10/364,294, filed Feb. 2003, Vanderperren et al.*

(Continued)

*Primary Examiner*—Chieh M. Fan
*Assistant Examiner*—Naheed Ejaz
(74) *Attorney, Agent, or Firm*—Lisa K. Jorgenson; James H. Morris; Wolf, Greenfield & Sacks, P.C.

(57) ABSTRACT

A receiver and a method for receiving a signal including a carrier modulated with a known training sequence is described in which an estimate a carrier frequency offset is obtained from an autocorrelation signal by autocorrelation of the part of the received signal containing a known training sequence. The received signal is compensated with the frequency offset obtained to form a compensated received signal, and a timing reference for the received signal is obtained by cross-correlation of the compensated received signal with a known training sequence.

24 Claims, 24 Drawing Sheets

U.S. PATENT DOCUMENTS

| | | | | |
|---|---|---|---|---|
| 6,658,063 | B1 * | 12/2003 | Mizoguchi et al. | 375/260 |
| 6,674,817 | B1 * | 1/2004 | Dolle et al. | 375/342 |
| 7,123,670 | B2 * | 10/2006 | Gilbert et al. | 375/344 |
| 2002/0181509 | A1 | 12/2002 | Mody et al. | |
| 2003/0156594 | A1 * | 8/2003 | Trott et al. | 370/442 |
| 2003/0181183 | A1 * | 9/2003 | Ventura | 455/258 |
| 2003/0231718 | A1 | 12/2003 | Jiang | |

OTHER PUBLICATIONS

Almenar et al., "Synchronization techniques for HIPERLAN/2", Oct. 7-11, 2001, IEEE, vol. 2, p. 762-766.*

International Search Report from corresponding International Application No. PCT/BE2003/000178.

* cited by examiner

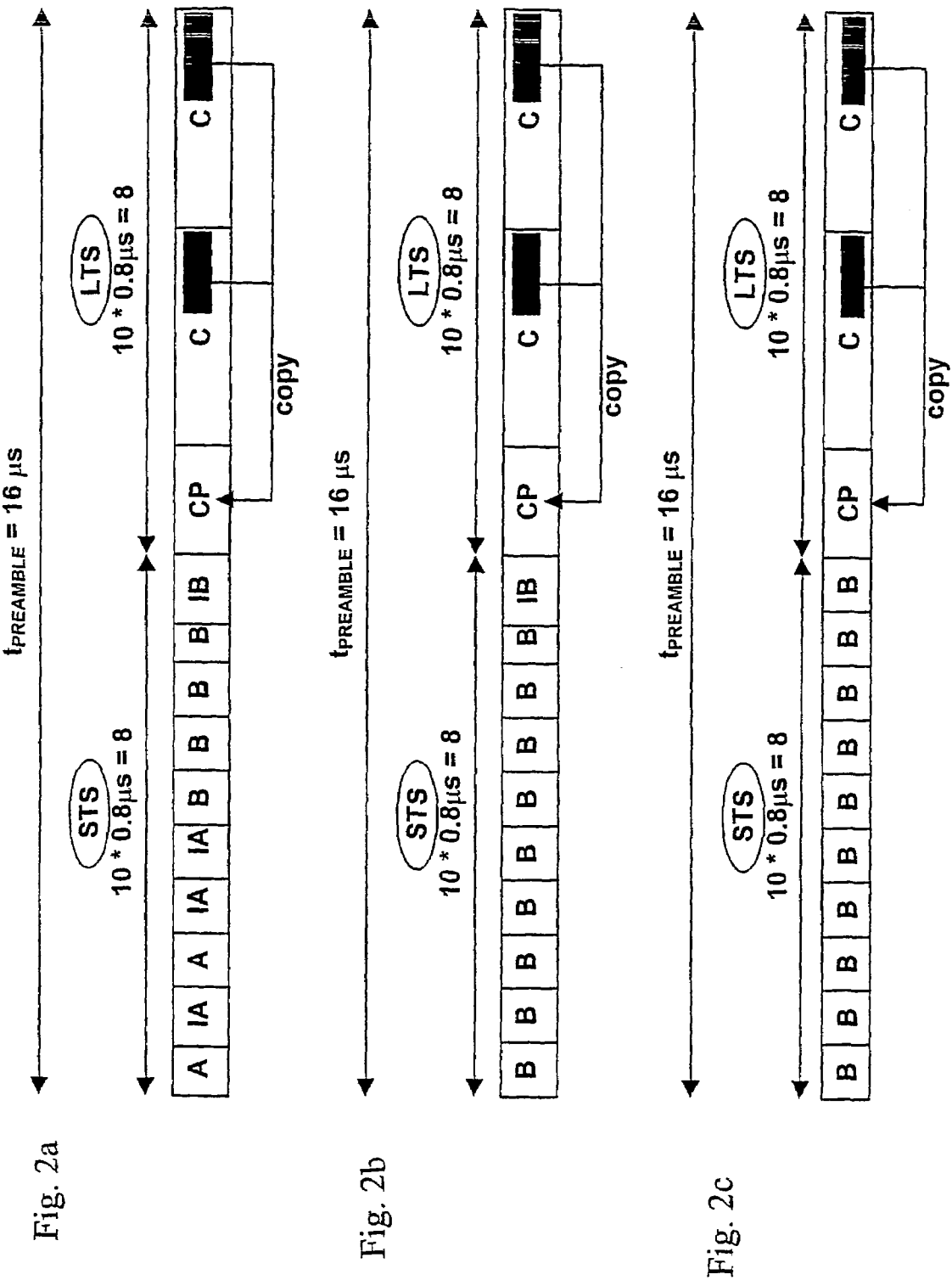

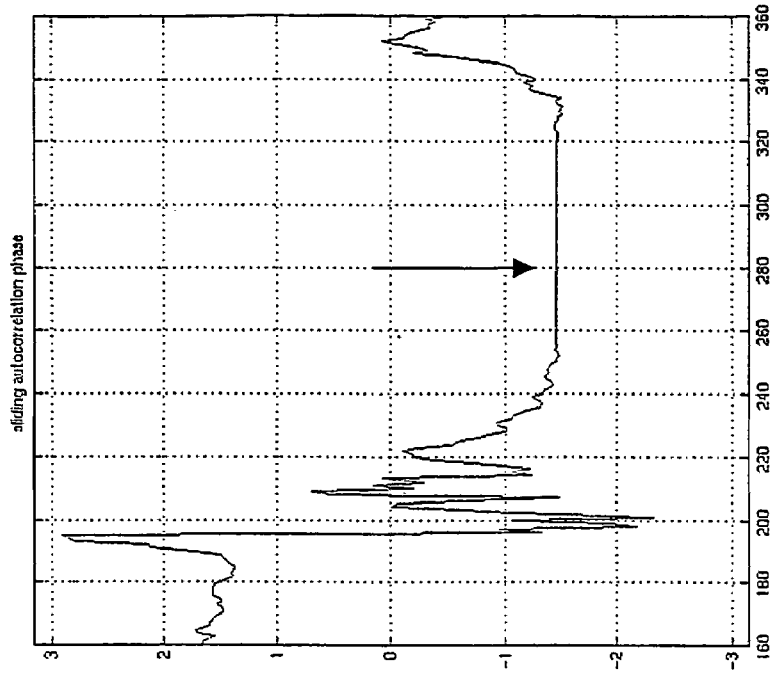
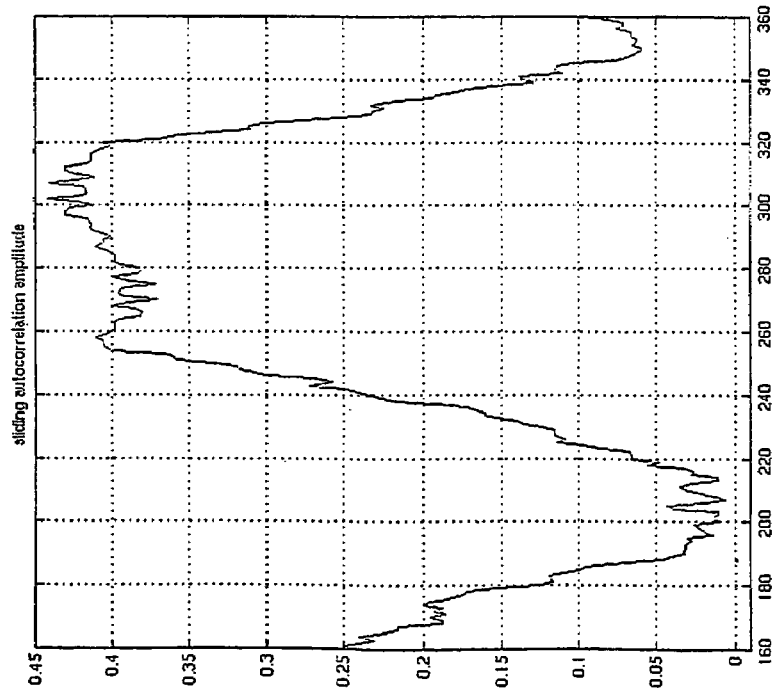
Fig. 13
Fig. 14

METHODS AND APPARATUS FOR SYNCHRONIZATION OF TRAINING SEQUENCES

BACKGROUND OF THE INVENTION

1. Field of the Invention

The present invention relates to methods and apparatus for synchronization of a received signal, and in particular to methods and apparatus for use in telecommunications networks. The present invention also relates computer program products for synchronization to a received signal in which data is sent in frames and training sequences are provided for synchronization. The present invention particularly relates to telecommunications networks in which data is sent in frames and training sequences are provided for synchronization, e. g. especially to OFDM and COFDM telecommunications systems.

2. Technical Background

There are many forms of known telecommunications systems including wireless based and wireline systems. Such systems may be used to transfer voice or data systems across a variety of channels, e. g. satellite, optical fibre, coaxial cable, cellular wireless, point-to-point microwave systems. In general there is a transmitter for transmitting a signal and a receiver for receiving the signal as part of the system. To improve reception, the transmitted signal may be coded in a variety of ways. A digital signal received at a receiver must be synchronized in some way in order to extract any message conveyed in the signal. There are various ways in which synchronization can be achieved. For instance, a known symbol sequence (e. g. a training symbol sequence) may be correlated with a received signal known to contain the same sequence. This may be called cross-correlation. Training sequences are widely used for synchronization. Alternatively, if the transmitted signal includes a repeated or cyclic sequence, such as a cyclic symbol prefix as can occur in OFDM (Orthogonal Frequency Division Multiplex) systems, the cyclic sequence may be autocorrelated with the same prefix received at a different time.

Such synchronization methods are known, for instance, from "Robust Frequency and Timing Synchronization for OFDM", Scmidl and Fox, IEEE Trans. On Communications, vol. 45, no. 12, Dec. 1997 and "On Synchronization in OFDM Systems using the cyclic prefix", Jan-Jaap van de Beek, Magnus Sandfell, Per Ola Börjesson, Proc. of the RVK 96, pages 663-667, Lulea, Sweden, June 1996.

OFDM has been proposed for various wireless telecommunications systems such as the IEEE 802.11a standard, the ETSI High Performance Local Area Network Type 2 (HIPERLAN/2), the ETSI Digital Audio Broadcasting (DAB) standard, and the pan-industry Digital Video Broadcasting (DVB) project.

Synchronization can become more difficult when there is a clock offset between the transmitter clock and the receiver clock. The channel across or through which the data is transmitted may distort received signals which may make synchronization more difficult. In radio systems there may be multiple paths between the transmitter and receiver which result in receipt of multiple signals delayed with respect to each other depending upon the length of the path. In the presence of channels having long impulse response times (that is, those in which the impulse response time is comparable to the length of the training sequence or the cyclic sequence), the accuracy of synchronization drops. Intersymbol Interference (ISI) becomes worse when the impulse response time is long and this can have a negative effect upon synchronization and, as a result, on the operation of a receiver. A further problem, especially with OFDM systems is carrier frequency offset. OFDM systems are more sensitive to frequency offset and phase noise than single carrier systems. In an OFDM system the subcarriers are perfectly orthogonal only if the transmitter and receiver use exactly the same frequencies. Any frequency offset results in Intercarrier Interference. Hence, frequency offset must be minimized. A related problem is phase noise. A practical oscillator does not produce a carrier at exactly one frequency, but rather a carrier that is phase modulated by random phase jitter. As a result the received frequency is never constant. The received signal may also contain general noise, e. g. white Gaussian noise.

The first part of a typical OFDM frame comprises a preamble, for example a HIPERLAN/2 preamble consists of a short (STS) and a long training sequence (LTS). The 10 STS contains repetitions of a training symbol with duration of 800 ns on 12 subcarriers. Each of the symbols is a quarter of the duration of the part of a normal data symbol analyzed by the Fast Fourier Transform. Each data symbol of an OFDM signal has a cyclic prefix, i.e., the first To seconds part of each OFDM symbol is identical to the last part. The preamble also includes a long training sequence which two data symbol and a cyclic prefix. The STS may be used for coarse frequency estimation whereas the LTS may be used for precise frequency estimation. The STS may also be used for symbol timing estimation by cross-correlation.

An object of the present invention is to provide a method and apparatus for improved synchronization of a received signal.

A further object of the present invention is to provide a method and a system which allows robust synchronization even under extreme conditions.

Still a further object of the present invention is to provide a method and a system which allows synchronization with lower risk of perturbation caused by intersymbol interference.

Yet a further object of the present invention is to provide a method and a system which allows reception with a better bit or symbol error rate.

Still another object of the present invention is to provide a method and a system which allows reception with a higher transmission rate.

SUMMARY OF THE PRESENT INVENTION

The present invention provides a receiver for receiving a signal comprising a carrier modulated with a known training sequence comprising: a frequency offset estimation unit for receiving the signal and obtaining an estimate of a carrier frequency offset from an autocorrelation signal obtained by autocorrelation of the part of the received signal containing a known training sequence; a frequency offset compensation unit for compensating the received signal with the frequency offset obtained from the frequency offset estimation unit to form a compensated received signal, and a time reference determining unit for obtaining a timing reference for the received signal by cross-correlation of the compensated received signal with a known training sequence.

The frequency offset estimation unit may comprise means for determining a phase shift in the autocorrelation signal of the received signal. The receiver may also comprise means to detect a characteristic curve indicative of a known training sequence in the phase of the autocorrelation signal. The receiver may comprise means to detect a characteristic curve indicative of a known training sequence in the amplitude of the autocorrelation signal. The characteristic curve may include peaks and/or troughs. To avoid spurious synchronizations threshold values may also be used to make sure that only very significant peaks and troughs are detected while not being misled by the exact form of the peak or the trough. The threshold values may be set dynamically.

The frequency offset estimation unit may comprise means for determining the carrier frequency offset from the phase shift. The receiver may comprise means to determine a sign of the CFO from the phase of the autocorrelation signal from a known sequence.

The receiver may have means for determining an autocorrelation signal from a further known sequence of the received signal. For example, the receiver may have means for determining a phase shift in the autocorrelation signal from a further known sequence of the received signal. The time reference determining unit may comprise means to determine a characteristic curve indicative of a known training sequence or a further known sequence in the amplitude of the autocorrelation signal. The time reference determining unit may comprise means to determine a characteristic curve indicative of a known training sequence in the phase of the autocorrelation signal. The time reference determining unit may comprise means to determine a characteristic curve indicative of a known training sequence in the amplitude of the cross-correlation of the compensated received sequence with the known training sequence. The characteristic curve may include peaks and/or troughs. To avoid spurious synchronizations threshold values may also be used to make sure that only very significant peaks and troughs are detected while not being misled by the exact form of the peak or the trough. The threshold values may be set dynamically.

The receiver can be adapted to output the timing reference obtained from the received signal by autocorrelation of the received signal if the timing reference obtained by cross-correlation of the compensated received signal with the known training sequence is not present. The receiver is adapted to otherwise output the timing reference determined by cross-correlation of the received signal. The receiver may be adapted to compare the timing reference for the received signal obtained by cross-correlation of the compensated received signal with the known training sequence when present and the timing reference determined by autocorrelation of the received signal, and to output a reset signal if the two timing references differ by more than a threshold value and otherwise to output the timing reference for the received signal obtained by cross-correlation of the compensated received signal with the known training sequence. The timing reference determining unit may be adapted to determine a symbol timing from a correlation peak in the cross-correlation of the received signal with the training sequence. When the received signals also contain a cyclic prefix, an accurate value for the carrier frequency offset may be obtained by autocorrelation of the cyclic prefix with the received signal. Such a receiver as described above may be used in an OFDM telecommunications system.

The present invention also provides a receiver which receives a signal comprising a first and second known training sequence and uses autocorrelation of the first or the second known sequence for CFO estimation, autocorrelation of the first known sequence for a first timing and cross-correlation of the second known sequence for a second timing. Either the first or the second timing may be selected as the timing of the received signal. The first known sequence may be an STS sequence of a preamble and second known sequence may be an LTS of a preamble. The use of different known sequences increase the accuracy of the synchronization.

The present invention also includes deriving a rough timing reference, e.g. by autocorrelation, and an accurate timing reference, e.g. by cross-correlation, and for example selecting one of the two as the timing reference.

The present invention may also provide a method for processing a received signal comprising a carrier modulated with a known training sequence, comprising: obtaining an estimate of a carrier frequency offset from an autocorrelation signal obtained by autocorrelation of the part of the received signal containing a known training sequence; compensating the received signal with the obtained estimate of the frequency offset to form a compensated received signal, and obtaining a timing reference for the received signal by cross-correlation of the compensated received signal with a known training sequence. The autocorrelation step may comprise detecting a characteristic curve in the amplitude of the autocorrelation signal indicative of a training sequence. The autocorrelation step may also comprise detecting a characteristic curve in the phase of the autocorrelation signal indicative of the training sequence. The method may also comprise determining a phase shift in the autocorrelation signal. The method may also comprise determining the carrier frequency offset from the phase shift. The method may also comprise determining a characteristic curve indicative of the training sequence in the amplitude of the cross-correlation of the compensated received signal with the known training sequence. The method may also comprise outputting the timing reference for the received signal obtained by autocorrelation of the received signal if the timing reference obtained by cross-correlation of the compensated received signal with the known training sequence is not present. The method may comprise otherwise outputting the timing reference determined by cross-correlation of the compensated received signal with the known training sequence. The method may comprise: comparing the timing reference for the received signal obtained by cross-correlation of the compensated received signal with the known training sequence when present and the timing reference determined by autocorrelation of the received signal, and outputting a reset signal if the two timing references differ by more than a threshold value and otherwise outputting the timing reference for the received signal obtained by cross-correlation of the compensated received signal with the known training sequence.

The present invention may provide a receiver for receiving a signal comprising a carrier modulated with a known training sequence comprising:

an autocorrelation unit for generating a phase and an amplitude autocorrelation signal by autocorrelation of a known sequence in the received signal, a time reference determining unit for obtaining a timing reference for the received signal, the time reference determining unit comprising means to detect synchronization using both the phase and amplitude signals.

The present invention may provide a method for obtaining a timing reference form a received signal comprising a carrier modulated with a known training sequence comprising:

generating a phase and an amplitude autocorrelation signal by autocorrelation of a known sequence in the received signal, and obtaining a timing reference for the received signal by detecting synchronization using both the phase and the amplitude signals.

The present invention may also provide a receiver for receiving a signal comprising a carrier modulated with a known training sequence comprising: an autocorrelation unit for generating an autocorrelation signal by autocorrelation of a known sequence in the received signal, a time reference determining unit for obtaining a timing reference for the received signal, the time reference determining unit comprising means to detect synchronization by detecting at least two synchronization conditions in the autocorrelation signal.

The present invention may also provide a method for obtaining a timing reference form a received signal comprising a carrier modulated with a known training sequence comprising: generating an autocorrelation signal by autocorrelation of a known sequence in the received signal, and obtaining a timing reference for the received signal by detecting synchronization using at least two synchronization conditions in the autocorrelation signal.

The present invention may also provide a computer program product which when executed on a computing device executes any of the methods of the present invention. The computer product may be stored on a data carrier such as a CD-ROM, diskette, tape driven, hard disc, etc.

BRIEF DESCRIPTION OF THE DRAWINGS

FIGS. 2a to c are representations of preambles of OFDM frames which may be used with the present invention. FIG. 2a represents the HIPERLAN 2 (ETSI) broadcast preamble, FIG. 2b of the HIPERLAN 2 (ETSI) up long preamble and FIG. 2c of the IEEE 802.11a preamble.

FIGS. 5c and 5d show the amplitude and phase (in radians) outputs of the autocorrelation unit of FIG. 4 when there is a CFO (240 kHz) for the preamble of FIG. 2a.

FIGS. 13a and 13b show the results of a sliding correlation on the LTS portion of a preamble when there is a CFO, FIG. 13a shows the amplitude signal and FIG. 13b the phase signal.

FIG. 14 shows a sliding correlation which may be used with the LTS portion of the preamble in embodiments of the present invention.

DETAILED DESCRIPTION OF THE ILLUSTRATIVE EMBODIMENTS

The present invention will be described with reference to certain embodiments and to certain drawings but the present invention is not limited thereto but only by the attached claims. The present invention will also be mainly described with reference to an OFDM system, but the present invention includes within its scope, any other type of telecommunications system which makes use of a known training sequence. In particular the methods and apparatus described below can be used with either circuit switched or packet switched systems and the application of any of these methods and apparatus to packet or circuit switched systems is included within the scope of the present invention.

Figures 1, 4:
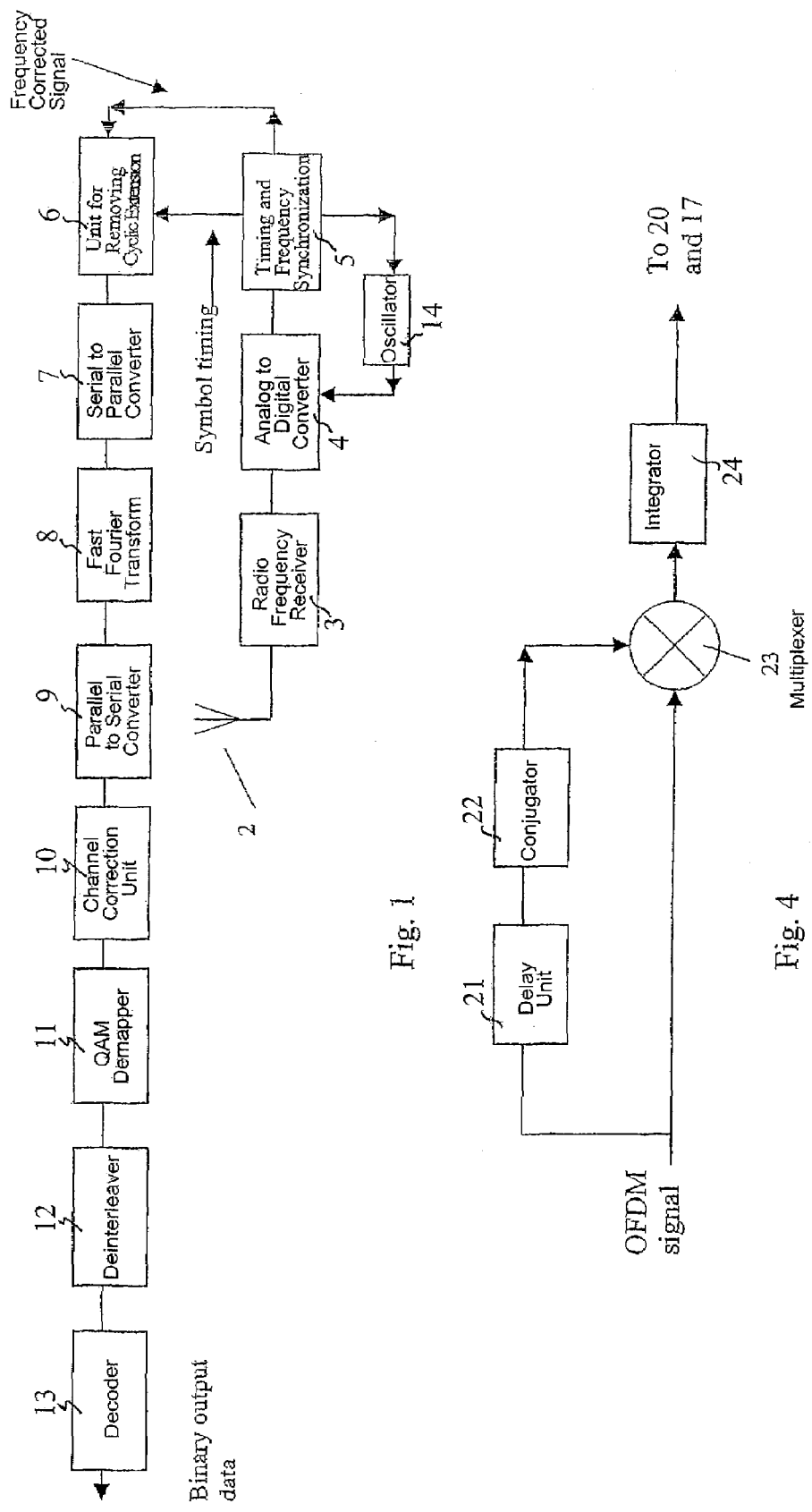
FIG. 1 is a schematic representation of an OFDM receiver which may be used with the present invention.
FIG. 4 is a representation of an autocorrelation unit and frequency offset unit which may be used with the timing and frequency synchronization unit of FIG. 3.

FIG. 1 is a schematic representation of a non-limiting OFDM receiver 1. It comprises an antenna 2, a radio frequency receiver unit 3 usually comprising a filter, an analog to digital converter 4, a timing and frequency synchronization unit 5 in which timing and frequency are extracted, a symbol timing is exported and the incoming signal is corrected for any frequency and/or timing offset, a unit 6 for removing the cyclic extension, a serial to parallel converter 7, a fast Fourier transform unit 8, a parallel to serial converter 9, a channel correction unit, 10, a QAM demapper 11, a deinterleaver 12 and a decoder 13. Such a receiver is known for instance from "OFDM for Wireless Multimedia Communications", Richard Van Nee and Ramjee Prasad, Artech House, 2000. The analog to digital converter is driven by a local controlled oscillator 14. The oscillator 14 can be controlled by the output of the synchronization unit 5 to correct for any difference between the transmitter and receiver clocks.

The present invention relates, for instance, to a timing and frequency synchronization unit which could be used in a receiver 1. Generally, a transmitted signal contains a training sequence comprising at least a known succession of samples which the receiver can rely on. Usually, this is placed at the start of a frame although the present invention is not limited thereto, e. g. it includes mid-ambles or other positions of a training sequence. Also in the particular case of an OFDM frame, the preamble contains a cyclic prefix sequence.

One aspect of the present invention is to use a succession of at least two detection mechanisms in an optimized way, that is an autocorrelation (sliding correlation between two sets of received samples spaced in time) and a cross-correlation (correlation between expected or known samples and received samples). The sliding autocorrelation may be used to obtain a rough synchronization timing, a characteristic relating to the carrier frequency offset and/or a rough value for the carrier frequency offset. Where the received signal has more than one training sequence (e. g. STS and LTS), the autocorrelation may be performed on more than one training sequence and different information may be obtained from the analysis of each training sequence. The estimate of the carrier frequency offset may then be used to compensate the received signals for carrier frequency offset (CFO) before a more accurate estimate of timing is obtained by a cross-correlation between the received, compensated samples and the expected samples of a known training sequence. The known sequence used for cross- correlation is not necessarily the same as the sequence used for autocorrelation. For example, a sliding autocorrelation of one part of the preamble may be used to find initial information relating to the carrier frequency offset (e. g. the sign of the offset) and this initial information can be used to obtain a more accurate measure of the CFO by sliding autocorrelation of another part of the preamble. Using first of all the rough estimate and later the more accurate CFO value, a buffered input signal is compensated for CFO and then used to obtain a final accurate value of the symbol timing by cross-correlation with a known sequence.

Typical OFDM preambles are shown in FIG. 2. The sequence of FIG. 2b is typically used in HIPERLAN/2 OFDM systems as the up long preamble and this will be used in the following for an explanation of the present invention although reference will also be made to the other sequences. The present invention can be applied to other sequences once the principles are understood. The FIG. 2b sequence comprises a short training sequence (STS) having 9 repetitions of a training symbol B of 16 samples with duration of 800 ns. The tenth symbol is the inverse of B (IB). The short training symbols are followed by a long training symbol (LTS) that is 8 microseconds long. The first 1.6 microseconds serves as a guard interval which is copied into the last 1.6 microseconds of this symbol. The OFDM preamble and data are modulated onto several carriers, generally each carrier having a carrier frequency higher than the symbol frequency of the OFDM signal. The sequence of FIG. 2a also includes 10 repetitions of a training symbol, but two symbols A and B are used and there is a higher percentage of IA and IE. The IEEE preamble of FIG. 2C does not include an IB and will be discussed below later.

Figure 3:
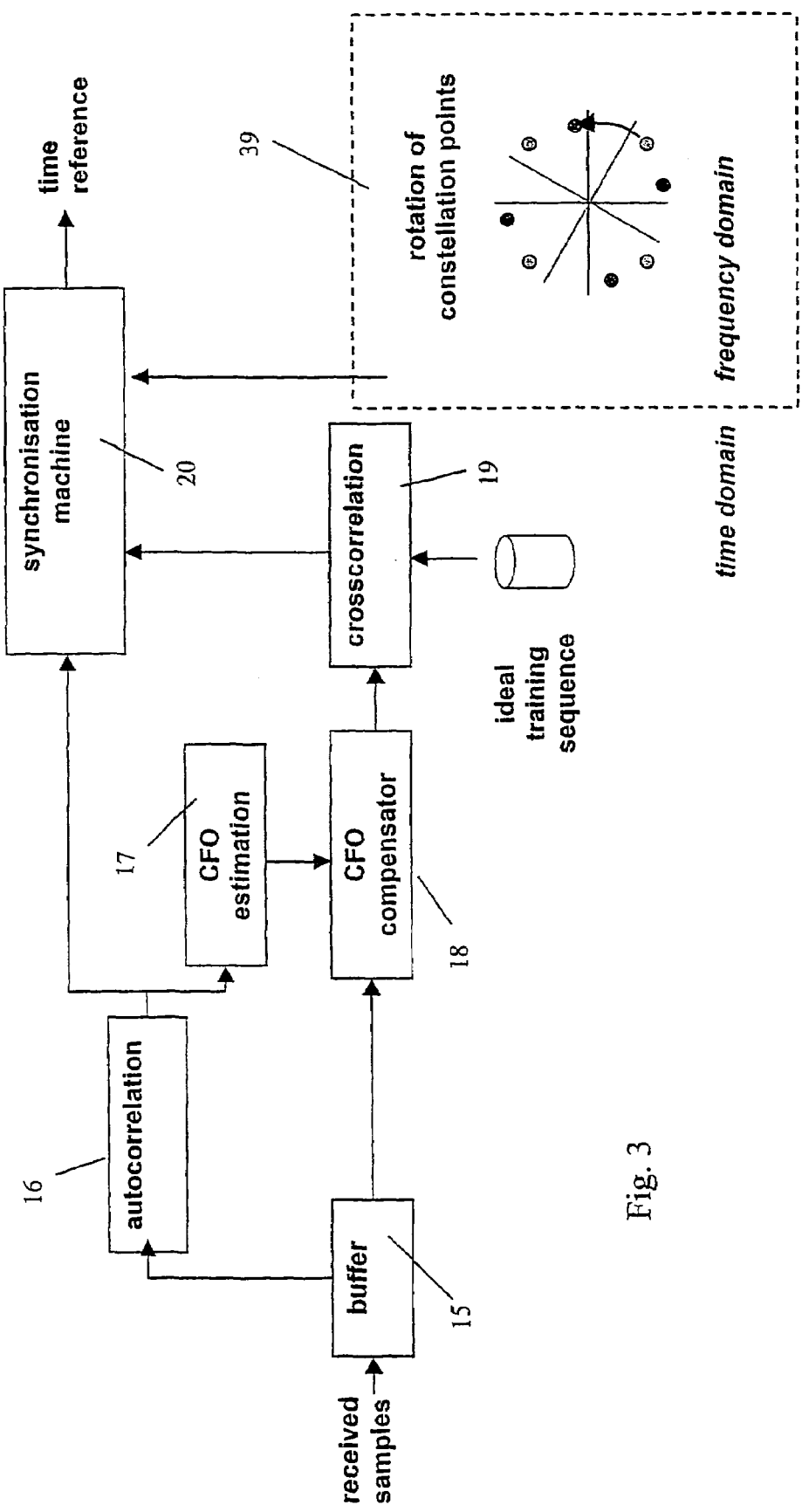
FIG. 3 is a detail of a timing and frequency synchronization unit in accordance with an embodiment of the present invention.

FIG. 3 is a detail of a timing and frequency synchronization unit 5 in accordance with an embodiment of the present invention. It comprises a buffer 15 for buffering received samples for a period of time until a first frequency offset value has been obtained in a frequency offset estimation unit 17. An autocorrelation unit 16 preferably outputs an autocorrelated amplitude and/or an autocorrelated phase signal of the received signal. The modules shown in FIG. 3 may map to real physical entities however there is no need for a one-to-one relationship with physical entities. For instance the complete system of FIG. 3 may be implemented in software running on a processing element such as a microprocessor.

In a first embodiment of the present invention, a first rough carrier frequency offset (CFO) is obtained by the frequency offset estimation unit 17 using an output of the autocorrelation unit 16. A first rough symbol timing is obtained by a synchronization machine 20 using an output from the autocorrelation unit 16. At least the phase output (optionally the amplitude output as well) of the autocorrelation unit 16 is supplied to the frequency offset unit 17. The amplitude signal and/or the phase output from the autocorrelation unit 16 is supplied to the synchronization machine 20. The CFO estimation unit 17 and the synchronization machine 20 may both be parts of a processing engine based on a microprocessor.

Figure 10B:
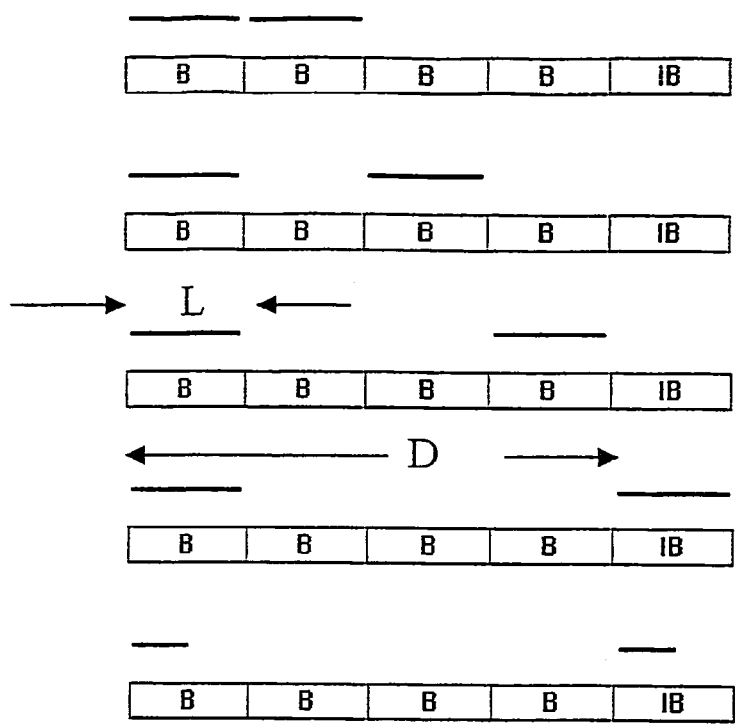
FIGS. 10b and 10c show forms of sliding correlations with varying correlation distance D which may be used with the present invention.
Figure 10A:
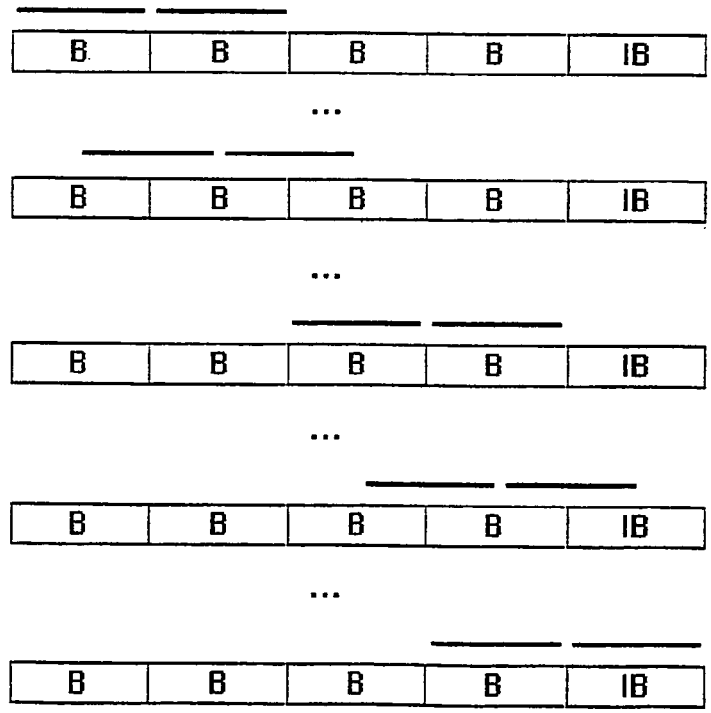
FIG. 10a shows how a sliding correlation can be performed.
Figure 10C:
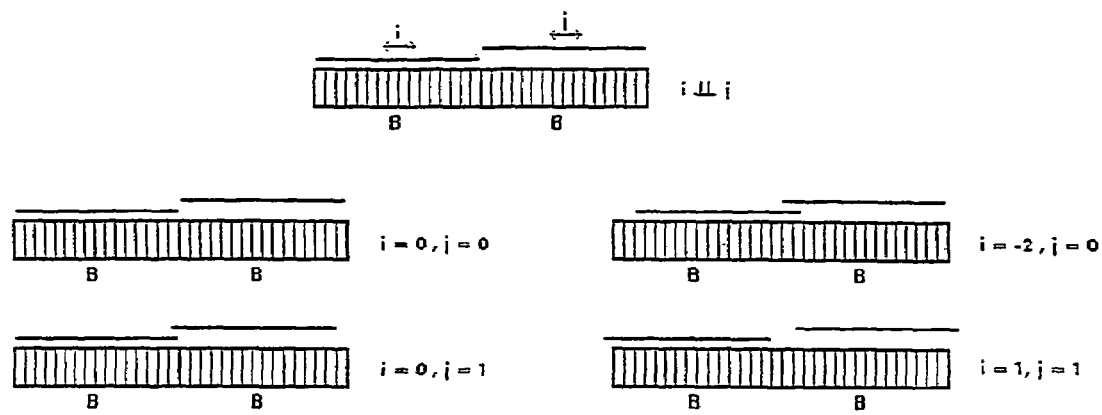

The autocorrelation unit 16 can be adapted to use one or more types of sliding autocorrelation. The principle of a sliding autocorrelation is shown schematically in FIG. 10a for a part of the STS of the preamble of FIG. 2b. Autocorrelation relates to correlation of a first set of samples (indicated by a bar) with a later set of samples (indicated by another bar). The distance between the starts of the two sequences is called the correlation distance D. The number of samples used in the correlation is called the correlation length L. Some additional examples are shown schematically in FIGS. 10b for a part of the STS of the preamble of FIG. 2b, these examples having different correlation distances. Additional forms of sliding correlation may be used in which the two sets of samples overlap as shown schematically in FIG. 10c. As can be seen, the distance between the two sets of samples can be varied to obtain different correlation distances which then output autocorrelations having different properties. The correlation progress along the incoming signals is shown schematically in FIG. 10a whereby the calculation moves forward either sample by sample or every so many samples calculating the result of the correlation over the number of samples of each set. In accordance with the present invention any suitable form of sliding correlation may be used.

A preferred form of sliding correlation is such that each set of samples is as long as one symbol (16 samples for the STS of the preamble of FIG. 2b) and the two sets of samples represent two adjacent symbols. When the sliding autocorrelation is performed on a part of the received signal which includes a known training sequence, for example, the short training sequence of the HIPERLAN/2 frame of FIG. 2b, the output of the unit shows characteristic waveforms. Such an autocorrelation unit 16 and frequency offset unit 17 may be as shown in FIG. 4. The incoming OFDM samples are delayed in a delay unit 21 by an integral number of time intervals between symbols. The complex conjugate of a first set of samples is then formed in a conjugator 22, e.g. 16 samples. A later set of samples, e.g. of the next 16 samples, and the conjugate of the earlier set are then multiplied together in a multiplier 23. An integration (or usually a summation of individual values) is carried out over the time interval of the set of samples used in the correlation in an integrator 24.

Figure 5B:
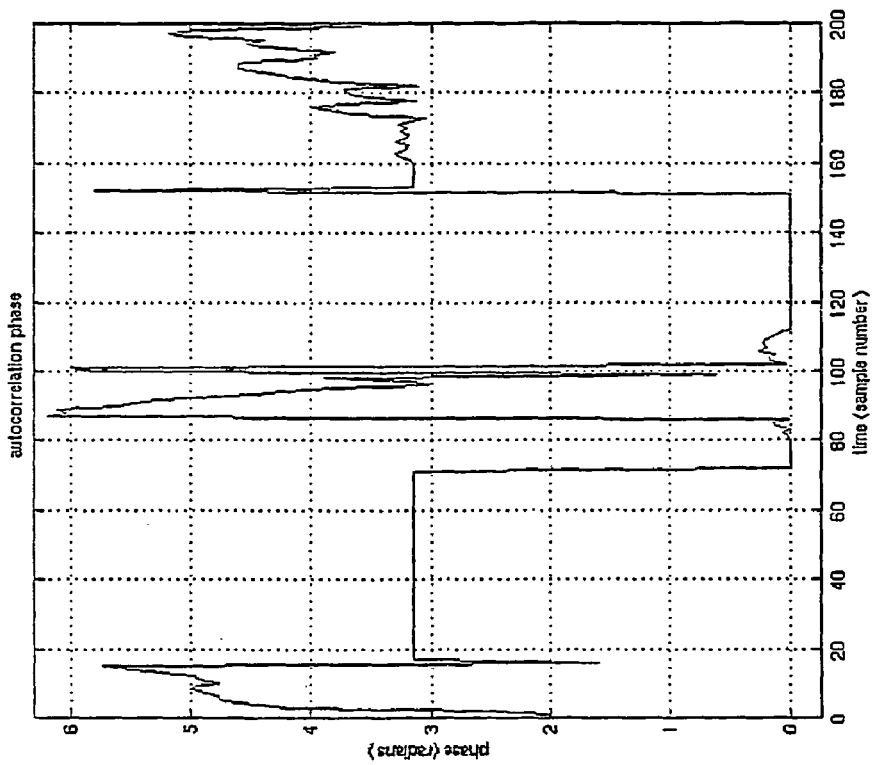
FIGS. 5a and 5b show the amplitude and phase (in radians) outputs of the autocorrelation unit of FIG. 4 when processing a preamble as shown in FIG. 2a (ETSI broadcast no CFO) with respect to sample number.
Figure 5A:
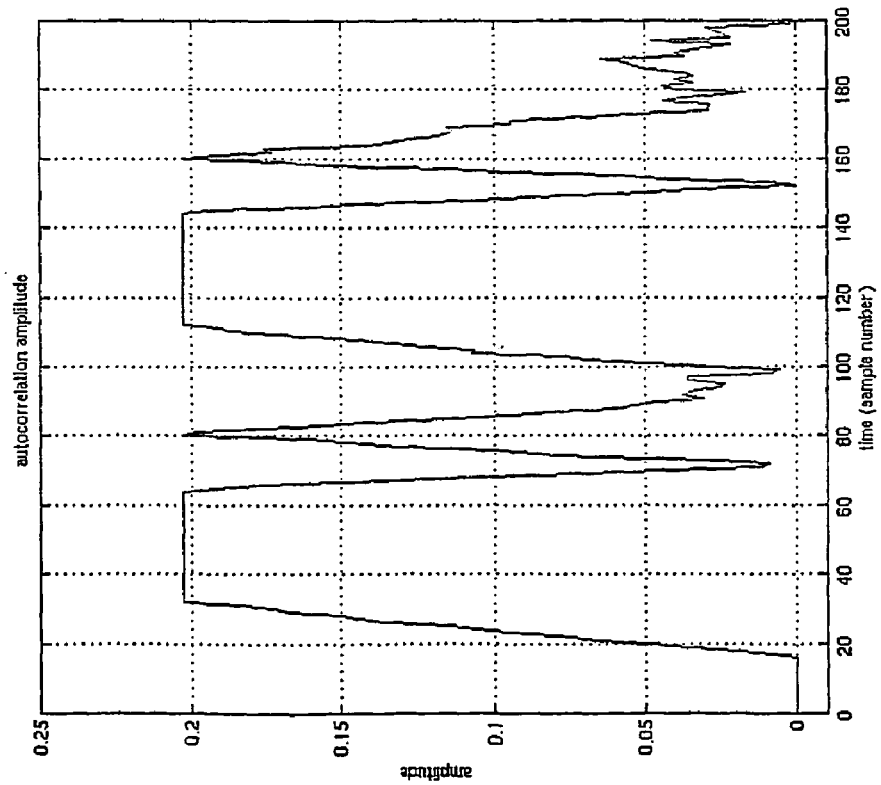
Figure 5D:
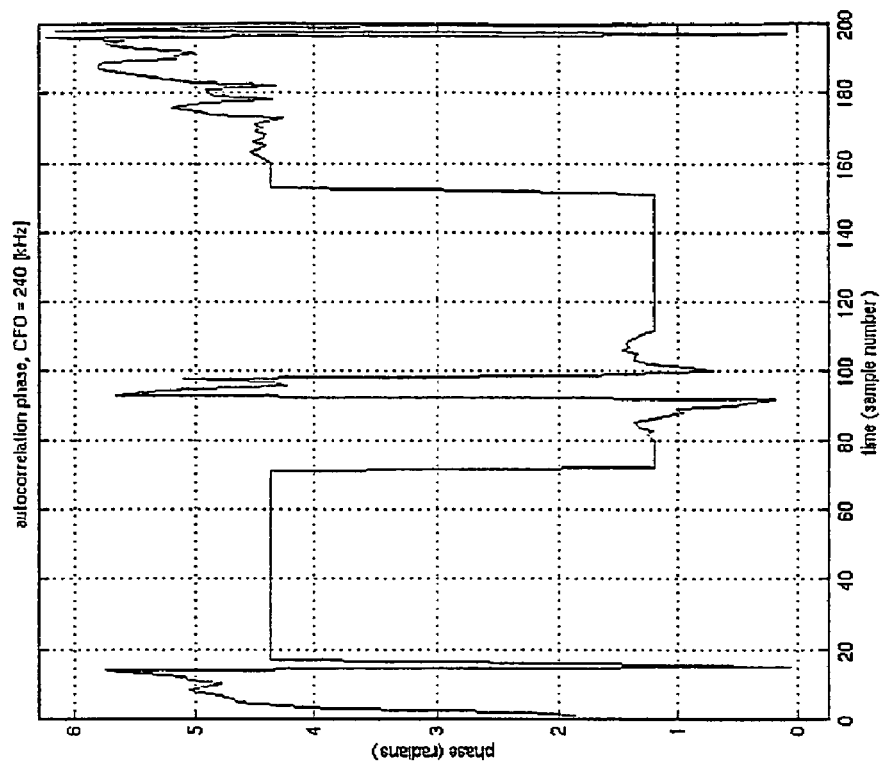
Figure 5C:
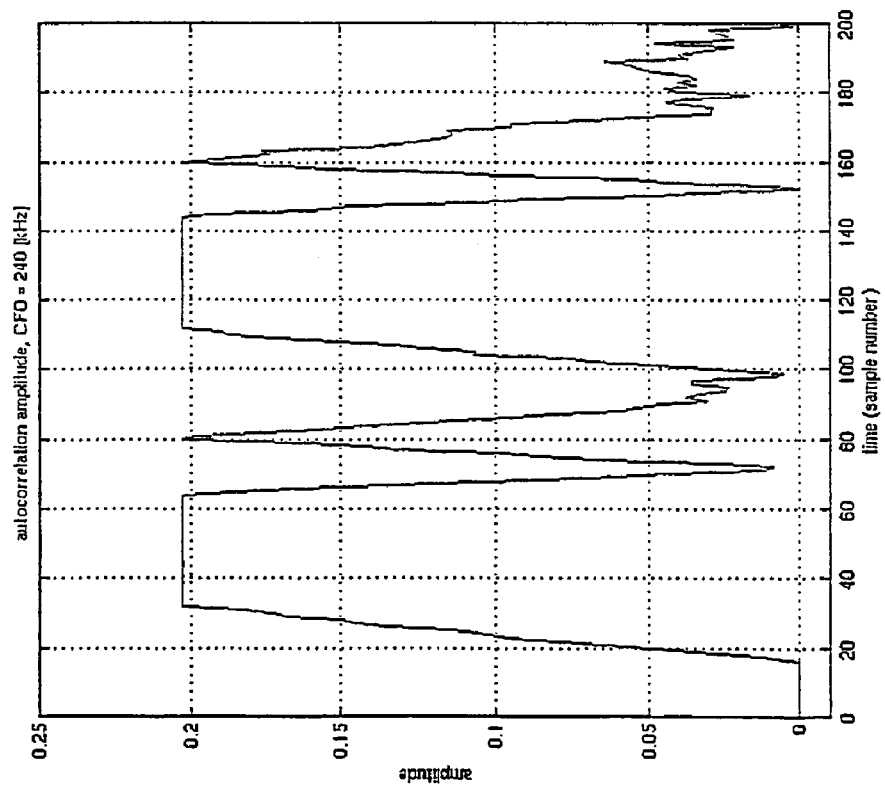
Figure 5F:
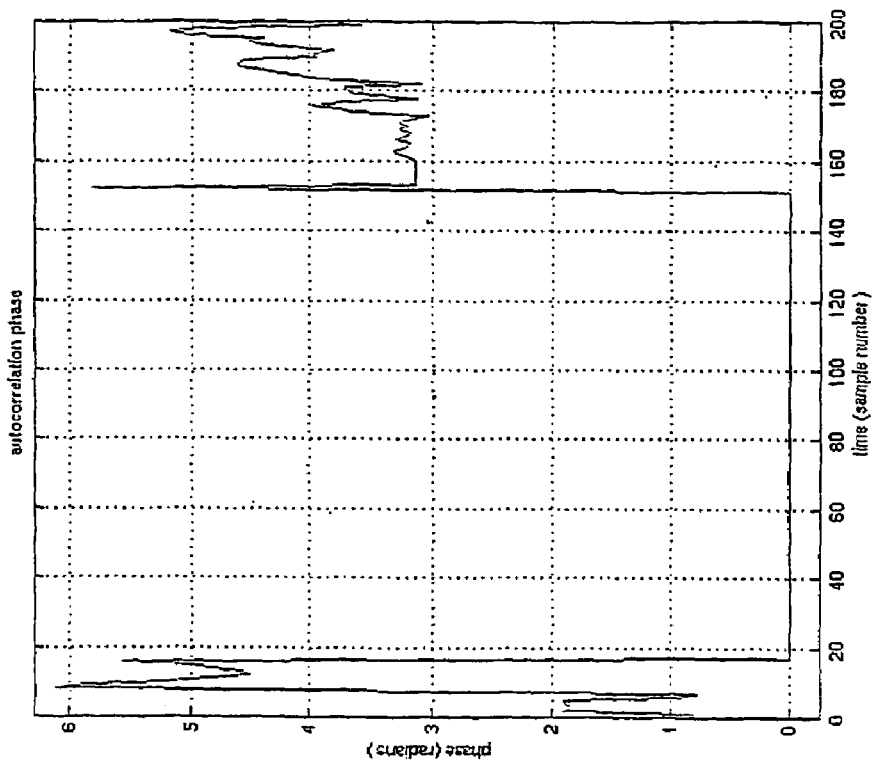
FIGS. 5e and 5f show the amplitude and phase (in radians) outputs of the autocorrelation unit of FIG. 4 when processing a preamble as shown in FIG. 2b (ETSI up long no CFO) with respect to sample number.
Figure 5E:
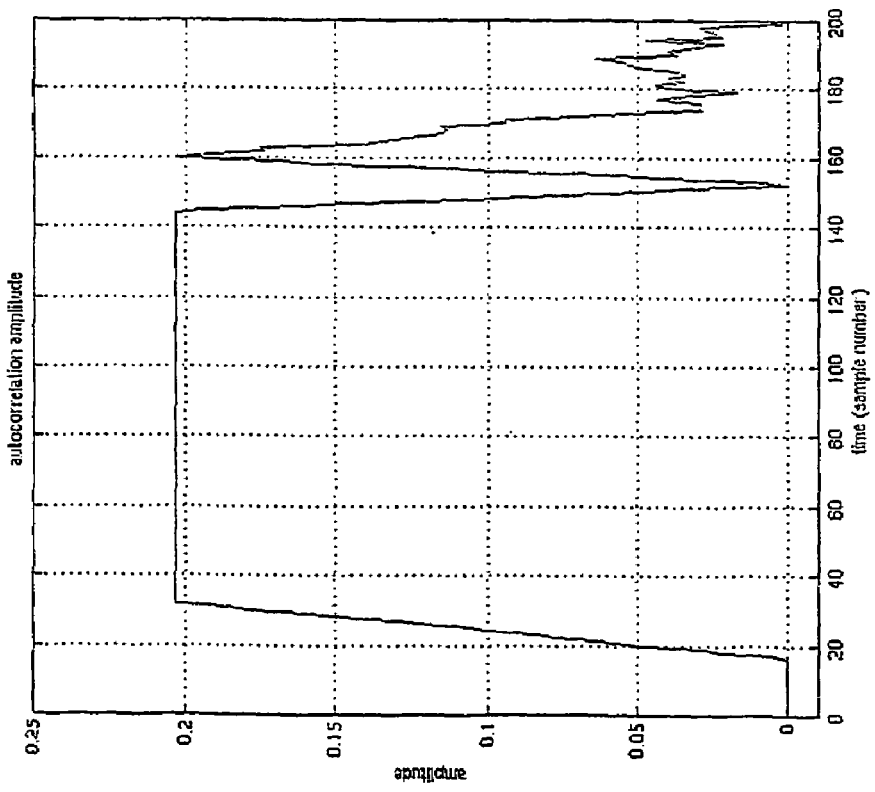
Figure 11A:
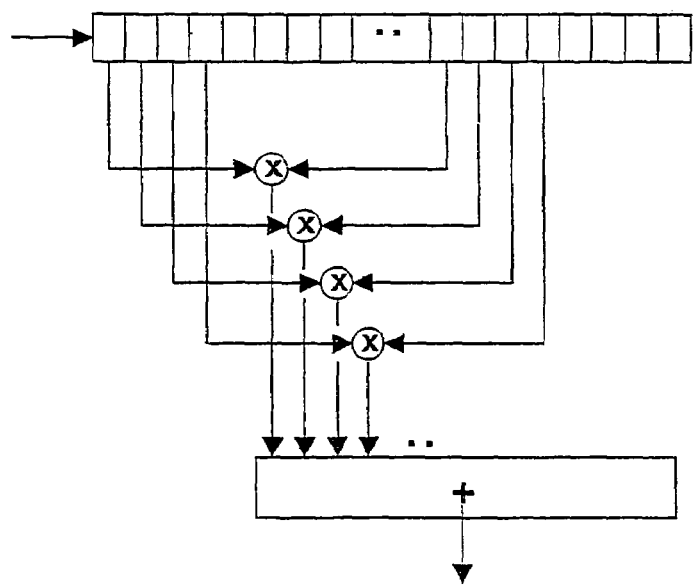
FIGS. 11a and 11b show schematic representations of the mechanism of autocorrelation and cross correlation which can be used with the present invention.
Figure 11B:
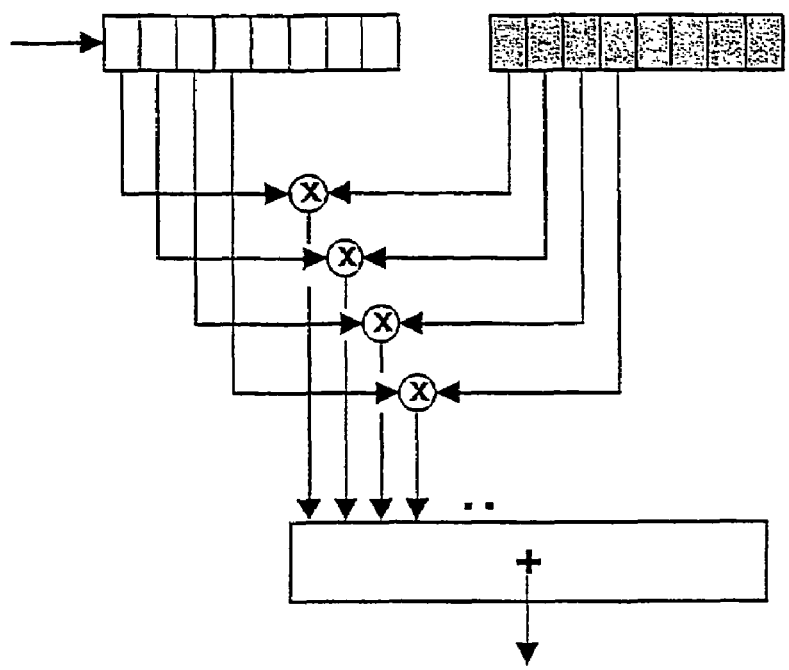

A schematic representation of a sliding autocorrelation is shown in FIG. 11a. The result of the integration can be both an amplitude signal and a phase signal. FIGS. 5a and 5b show the amplitude and phase outputs of the autocorrelation unit 16, respectively, with respect to sample number when performing a sliding autocorrelation of the STS of the preamble of FIG. 2a. FIGS. 5e and f shows similar curves for the STS sequence of FIG. 2b. These curves have characteristic shapes or waveforms which may be used as signatures in the determination of frequency offset and symbol timing. The characteristic shapes visible and detectable in these curves depend upon the exact training sequence used. With reference to FIGS. 5e and f, the sliding autocorrelation progresses until the preamble is reached. The autocorrelation result shows that the symbols are in-phase for B/IB symbols followed by a change of phase of 180° at the IB symbol which is completed at sample 160. This results in a long plateau followed by the phase jump associated with the B/IB transition which can be used alone or in combination with the plateau to identify the location of the B/IB transition. This jump should be 180° or $\pi$ (pi) radians. FIGS. 5a and b show similar features for the STS of FIG. 2a, there are smaller plateaus and more reversals of phase but the waveforms are similar.

Figure 5H:
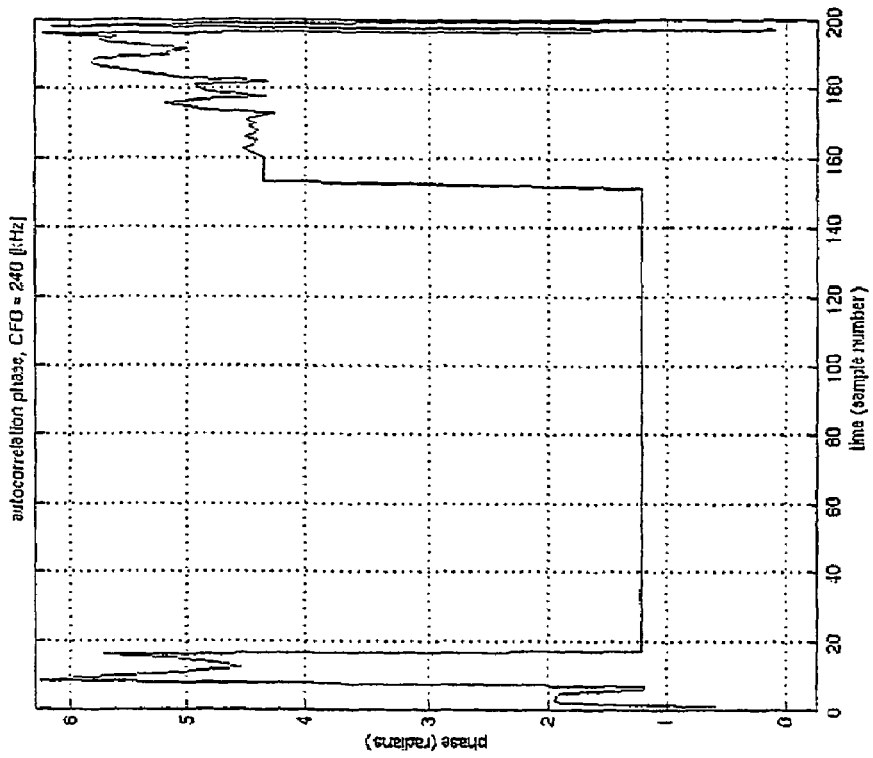
FIGS. 5g and 5h show the amplitude and phase (in radians) outputs of the autocorrelation unit of FIG. 4 when there is a CFO for the preamble of FIG. 2b (ETSI up long CFO=240 kHz).
Figure 5G:
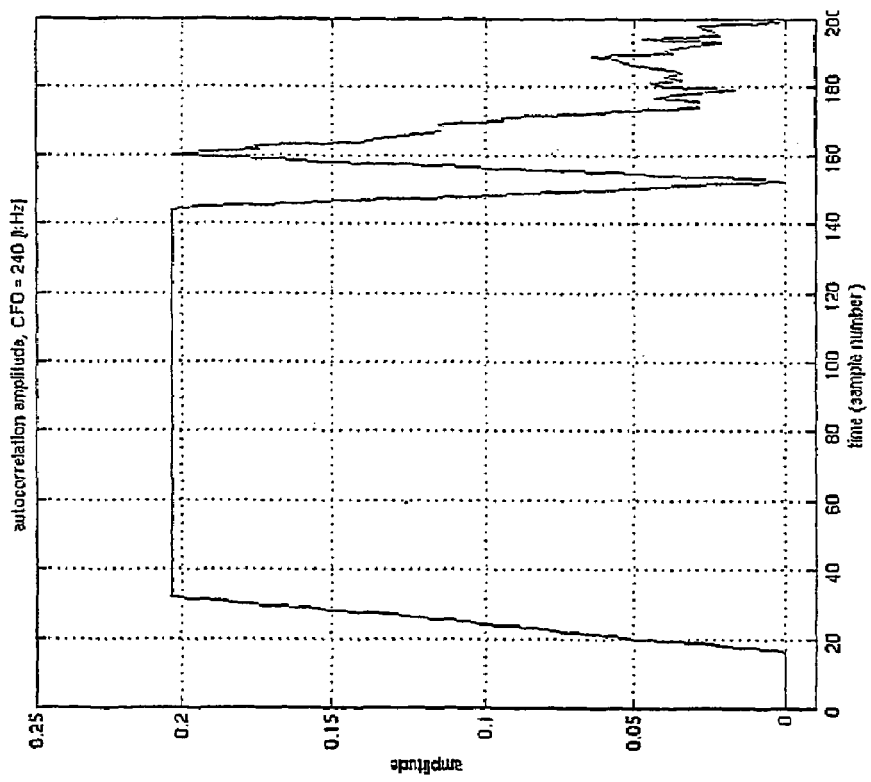

A particularly useful characteristic of the sliding correlation is that the frequency offset can be determined if a generally flat section, e.g. an in-phase section (from sample 20 to sample 150) or an exactly out-of-phase section (from sample 150 to sample 160) is available in the phase output. In FIGS. 5d and 5h, the plateau in the phase domain is shifted up or down with respect to its zero CFO position (i.e. as in FIGS. 5b and d, respectively). That is, for example, if the section between sample 20 and 150 in FIGS. 5f or FIG. 5h is not at zero phase or the section between sample 150 and sample 160 is not at $\pi$ (pi) radians. If there is a frequency offset, then identical symbols will appear as having a phase difference with respect to each other (the frequency offset being sensibly constant for the short times involved here) which will raise or lower the complete curve. An example of a frequency offset of 240 kHz is shown in FIGS. 5c and d and FIGS. 5g and h from autocorrelation of the STS preamble of FIG. 2b. It can be seen that the amplitude diagram of FIG. 5c or 5g is hardly different but the flat portions of the phase diagram of FIG. 5d or 5h have been raised. Thus, from knowing the expected curve, it is possible to estimate the frequency offset by determining how much the curve has been shifted up or down on this graph. The estimate of frequency offset is extracted in the frequency offset unit 17 and output to the frequency offset compensation unit 18.

In accordance with a second embodiment a more accurate estimate of the CFO is obtained from the LTS. The LTS part of the preamble of FIGS. 2a, b, c contains 2 specific OFDM symbols (C) of normal length (64 samples, hence called 'long training symbols' LTS), preceded by a cyclic prefix of the symbols copying the last 32 samples of the C symbols. For autocorrelation of the LTS's of FIGS. 2a-c, a correlation over 32 or more samples of the LTS is preferred. This requires that the autocorrelator unit 16 and the carrier offset estimation unit 17 need to be reconfigured when changing from 16 sample autocorrelation of the STS to 32 sample correlation of the LTS. CFO impacts the phase output from autocorrelation of the STS and the LTS in a similar way. FIGS. 13a and b show the amplitude and phase output of the autocorrelator unit for 32 samples for the LTS of FIG. 2b. The arrow in FIG. 13 shows clearly how CFO shifts the phase from 0 (ideal case with no CFO) to a value dependent upon the CFO value. The shift in phase is given by $2\pi*CFO*D*T_s$ where D is the correlation distance. In this case D is 64 samples (see FIG. 14). The phase signal from autocorrelation of the LTS can therefore be used for fine CFO estimation for this type of LTS. The phase rotation induced by CFO is bigger over a correlation distance of 64 samples of LTS than the 16 samples of STS, but noise is acting the same way in both cases. Therefore, the precision of the estimation from the LTS is better than from the STS. However, the use of more samples has a disadvantage that the phase rotation for a given CFO may be more than 180°. It is difficult to distinguish between positive and negative CFO in such a case because the worst-case phase rotation values overlap each other. It is preferred if at least information about the sign of the CFO is available before correlating the LTS. An estimate of the sign can be determined from autocorrelation of the STS of FIG. 2b. Thus, it is preferred in accordance with this embodiment if autocorrelation is used twice in determining the accurate CFO. Namely a first time on the STS with a small number of samples, e.g. 16, from which the sign of the CFO can be obtained, and secondly on the LTS using more samples to obtain a more accurate value for the CFO.

The sliding correlation using the LTS may use two groups of 32 samples separated as shown in FIG. 14, i.e. with a correlation so that when the first set of samples is at the beginning of the LTS, the second set is at the end of the symbol and overlaps the copy of the beginning of the LTS. The correlation length is longer than for STS (over 32 samples instead of 16) as is the correlation distance for the LTS of 64 samples. The estimation based on the LTS provides much more samples than with the STS. Ideally there are 65 samples with constant phase that can be used for CFO estimation. These consecutive phase samples can be averaged to decrease the sensitivity to noise.

This correlation can be computed using the same auto correlator unit 16 and frequency offset estimating unit 17 provided that the length and the distance of the correlation can be configured quickly after the STS samples are gone. A signal indicating that synchronization has been obtained on the STS may be sent from the synchronization machine 20 or if preferred from the CFO estimation unit 17. On receipt of the signal the units 16 and 17 change over to 32 sample correlation with D being 64 samples as described above. If the time is too short for reconfiguration, the units 16,17 may be duplicated and selected for the appropriate parts of the preamble as required. This reconfigurable infrastructure can also be used to track the cyclic prefix later on, during receipt of traffic data.

The following method of obtaining a rough timing may be used with either of the first and second embodiments. The amplitude output of FIG. 5e shows a section of about 120 samples when the correlation is high. This corresponds to the 9 B samples of the STS of the preamble of FIG. 2b. The inverse of B symbol(IB) causes loss of correlation followed by a short autocorrelation of the IB symbol. at sample 160. There are other features in the curve but these features are the most striking and can be used to identify this part of the sliding autocorrelation as being uniquely (or almost uniquely) related to the preamble. Hence, in accordance with an aspect of the present invention, features within the STS autocorrelation may be used to determine frame synchronization. This frame synchronization may be inaccurate but it is sufficient to determine a window within which frame synchronization surely occurs, that is a time window in which the start of the frame is likely to occur. This window can then be used in other parts of the correlation to restrict the region of waveforms in the received signal which are examined. This reduces the risk of an erroneous match of waveforms and makes the synchronization more robust. The width of the window can be made configurable, e. g. the window is made larger if synchronization is not achieved within a predetermined time.

Figure 12:
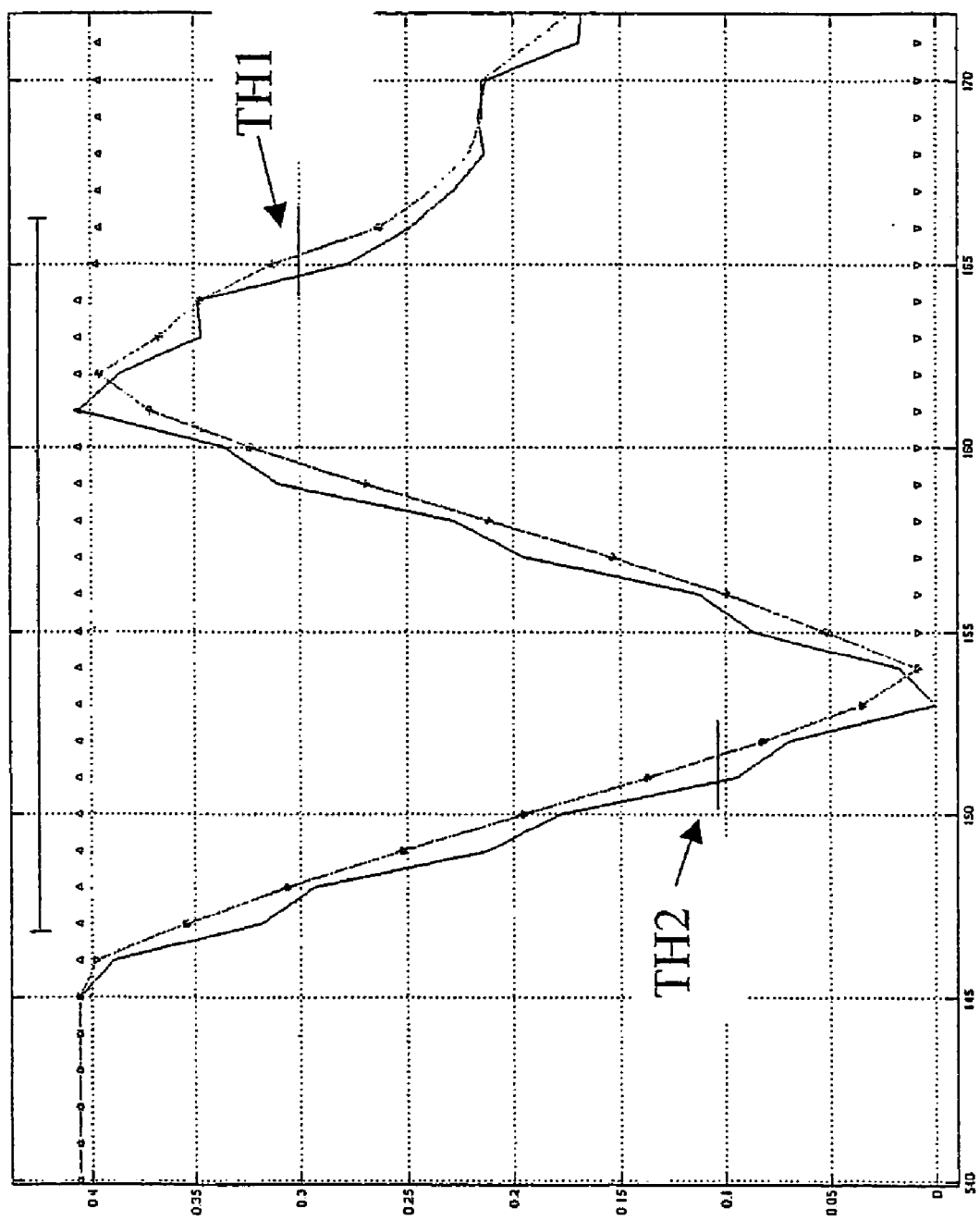
FIG. 12 shows a characteristic down-up-down signature structure used in accordance with embodiments of the present invention to determine synchronization.

In particular the characteristic of the steep drop followed by steep rise and then another steep drop between samples 144 and 174 can be used as distinctive feature of the amplitude curve. This form of curve can be analyzed using a simple shift register circuit whereby the length of the shift register forms a sliding window which restricts the zone under analysis. This window can be restricted in such a way that the shift register is not much bigger than the distance across the down-up-down feature thus eliminating spurious additional features. Thus, in such an arrangement a low peak followed by a high peak is sought for, i.e., the values in the shift register must show this characteristic down-up-down feature. To identify the peaks and troughs local maxima and minima in the amplitude output may be detected. However, due to the effects of noise and the channel, the top portions of the peaks and the bottom portions of the troughs may be distorted. To avoid spurious synchronizations threshold values may also be used to make sure that only very significant peaks and troughs are detected while not being misled by the exact form of the peak or the trough. An example of such upper and lower thresholds TH1 and TH2 is shown in FIG. 12. The present invention also includes adjusting the threshold values, e.g., TH1 and TH2, especially dynamically adjusting the values. A reason for adjusting the values may be to reach synchronization faster. For example if synchronization is not obtained within a reasonable time, e. g. within a first time, then the threshold values TH1 and TH2 may be adjusted so that they are further away from the peaks or nearer to the peaks shown in FIG. 12.

Thus, from knowing the expected curve it is possible to determine a rough timing of a specific symbol, e.g., of, IB at sample 160, with some security. The estimate of symbol timing is extracted in the synchronization machine 20. In the case of the preamble of FIG. 2b, there is still a possibility that certain symbols in normal data traffic may mimic these structures. A similar analysis can be used to extract the same information from the phase diagram either instead of the amplitude detection or in addition thereto. The shape of curve of the phase output in FIG. 5f, e.g., the 180 jump, can be used by means for identifying this phase signature in the synchronization machine 20 as a marker or signature to confirm that the relevant part of the amplitude diagram of FIG. 5e does in fact relate to the training sequence being used for autocorrelation. This provides added security that the correct part of the autocorrelation output of unit 16 has been selected. In addition a third criterion can be used, e.g. the distance between the lower and following upper peak of FIG. 12 must be within a certain distance. A comparison between various criteria combinations is given the following table 1.

and/or the phase outputs. In a preferred embodiment of the present invention a combination of conditions is used to determine rough synchronization, e. g. at least two selected from an amplitude peak-maximum and/or minimum, an amplitude peak above and/or below a threshold, an amplitude peak-to-peak distance, the presence of a plateau in the phase or amplitude output and a phase jump, and preferably three of these criteria as indicated in the second and third algorithms in table 1.

Figure 6:
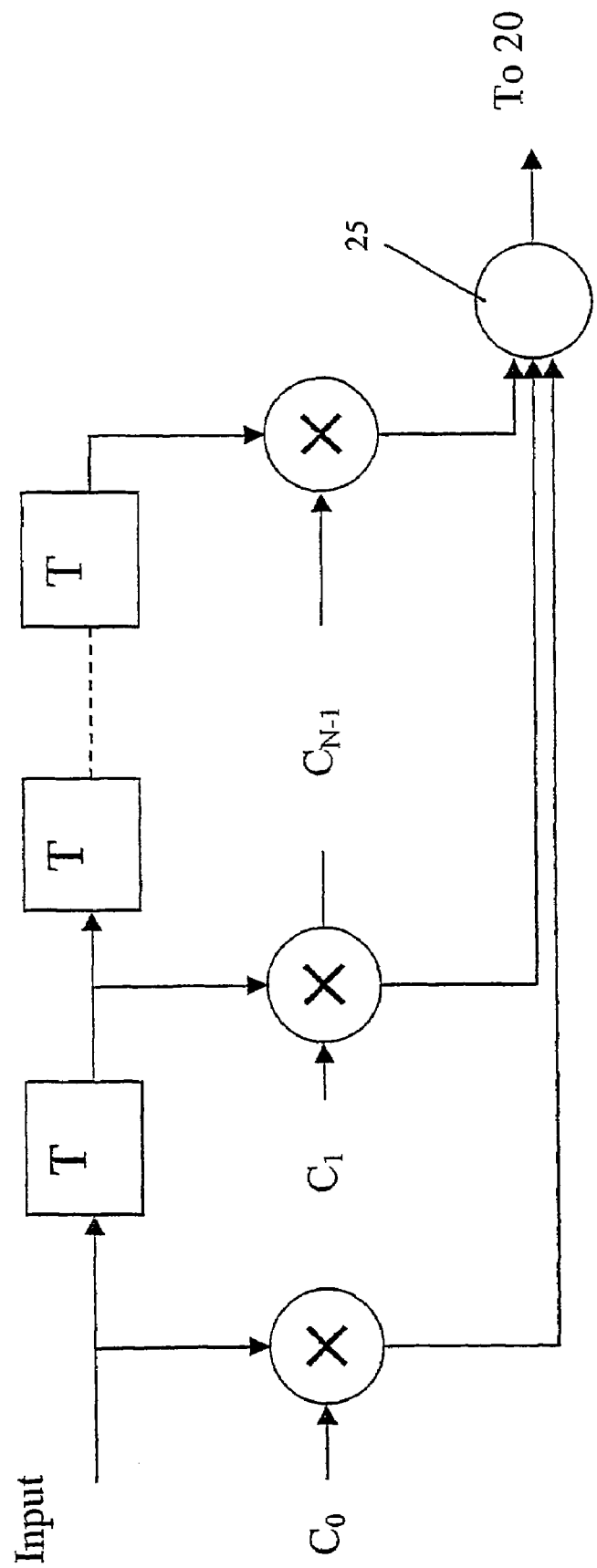
FIG. 6 shows a cross-correlator in the form of a matched filter for use in the timing and frequency synchronization unit of FIG. 3.

Returning to FIG. 3, the output of the frequency offset unit 17 (independent of whether this is a fine or coarse estimate) is used by the frequency offset compensator 18 to correct the samples ready to be used for a subsequent cross-correlation with a known training sequence. Cross-correlation is used to obtain an accurate timing. A cross-correlator unit may be as shown in FIG. 6 in the form of a matched filter. The sampling interval is given by T and Cl are the matched filter coefficients which are the complex conjugates of a known training sequence. The outputs from the filter stages are added in an adder 25. The output of the adder 25 is supplied to the synchronization machine 20.

Figure 7:
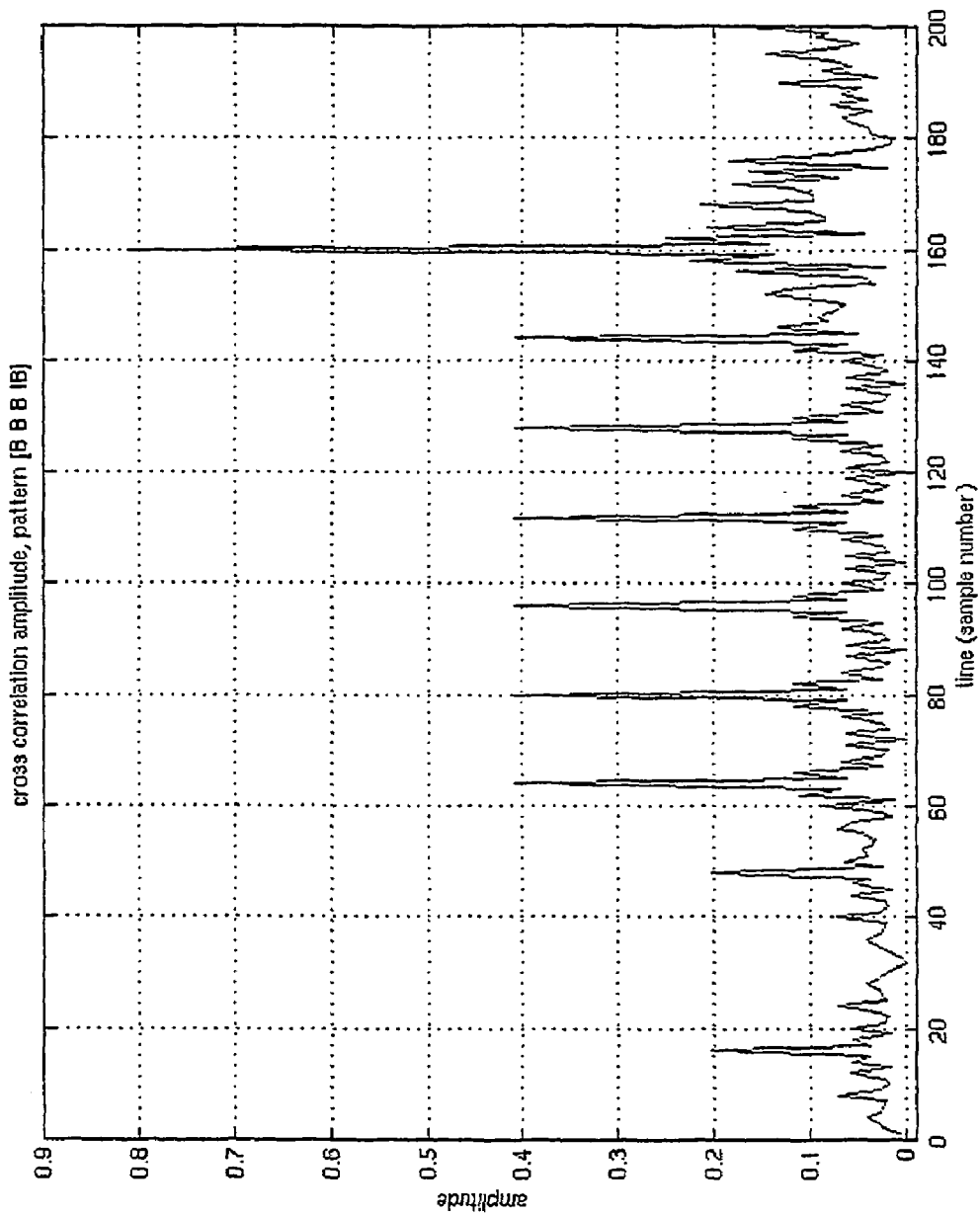
FIG. 7 shows the cross-correlation amplitude with sample number as an output of the cross-correlator of FIG. 6 (ETSI up long, FIG. 2b).

FIG. 7 shows the cross-correlation amplitude with sample number for the STS of the preamble shown in FIG. 2b. The curve shows various features (peaks) which are characteristic for the known training sequence. The form of the curve can be used to confirm that the correct part of the cross-correlation output has been used. From the correlation peaks an accurate symbol timing can be obtained. For example, the cross-correlation can be carried out on a selection of the nine B symbols and one IB symbol of the STS of FIG. 2b. For instance, a number of the B symbols and the IB symbol may be used, e. g. the last four symbols of the short training sequence can be used, that is B B B IB. In this case there are 64 taps on the filter. When this known sequence coincides with the same sequence in the received signal a high amplitude peak (100%

TABLE 1

| Algorithm | Complexity | Overall performances | Impact of noise | Impact of CFO/CO | Impact of Channel |
|---|---|---|---|---|---|
| Phase jump | Low | Low | High | Medium | Medium |
| Amplitude peaks (threshold) | Medium to High | Medium | Medium | Low | Low |
| Amplitude peaks distance Phase | | | | | |
| Amplitude peaks (extrema) Amplitude peaks distance Phase jump | High | Very good | Low | Low | Low |

In the first synchronization algorithm only the phase jump in FIG. 5f is used to determine synchronisation. In the second algorithm, the presence of peaks above and below a certain threshold with the amplitude output of FIGS. 5 a, c, e or g plus a distance between peaks within a tolerance and the phase jump within the phase outputs of FIGS. 5b, d, f or h are used in combination to improve synchronization. The values of the thresholds may be modified in accordance with a further aspect of the present invention to improve synchronization. In the third case the detection of peaks (i.e., a local maximum or minimum) or relative thresholds is used in conjunction with the peak to peak distance within a tolerance and the phase jump. The relative thresholds may be adapted dynamically to improve synchronization. The performance of the second and third synchronization algorithms are better than using a single criterion such as the phase jump. In addition detection of the presence of plateaus may be used in either the amplitude correlation) is obtained. This appears at sample 160. To be relatively confident that the correct match has been obtained it is useful to look at other information-e. g. to check that the accurate timing is close to the rough timing obtained from autocorrelation. For example, it is advantageous to check whether the obtained timing is within the window determined by autocorrelation of the STS. The cross-correlation for other positions of the short training sequence is high but not so high for parts of the sequence where there are 3 B symbols common to the received signal and to the known sequence. This occurs at 6 symbol positions of the preamble. The other two positions have two B symbols common and one B symbol common. The first of these gives a still lower peak and the second of these gives a peak which is almost indistinguishable. Hence, by having means for identifying the characteristic peak sequence of, for example, 6 peaks at regular intervals followed by a peak at near 100% correlation, the synchronization machine 20 can be relatively certain that the timing of the IB symbol has been obtained rather than a random correlation event. The synchronization machine 20 can then output the accurate symbol timing.

The algorithms above exploit the cross-correlation of the short training symbols. The cross-correlation length is preferably larger to provide robustness against noise. A higher correlation length increases the amplitude peaks. However the negative impact of the CFO becomes more and more significant as the correlation length increases. The CFO cannot be compensated before the CFO is known. As the symbols are short, the STS cross correlation peaks are close with respect to each other. The repetition of peaks has a period equal to the short training symbol length, i.e. 16 samples. In case of channels having an impulse response with a number of taps comparable to this length, the extra peaks due to the delayed contributions of the multipath components make it difficult to detect the peaks.

Although the IEEE preamble of FIG. 2c does not contain any IB symbol which causes a down and up waveform of the autocorrelation amplitude and a jump of $\pi$ of the autocorrelation phase, other properties may be used. The repetition of the B symbols creates an amplitude and a phase plateau of the autocorrelation output. The fact the phase is stable for a longer time than in the case of the ETSI preambles enables a more accurate CFO estimation to be performed. The correlation phase samples can indeed be averaged. In case of an autocorrelation over N samples, 160-2*N phase samples at most are available. In case of a 16 samples long correlation, 128 phase values can be used for the estimation of CFO. In practice less values should be taken into account, in order to allow some margin at the boundaries of the phase plateau. The accuracy which can be achieved by means of the STS is however not as good as what can be obtained using the LTS. The synchronization reference can't be set accurately using the autocorrelation because of the absence of an inverted symbol, but the detection of the STS autocorrelation signature, by means of criterions based on the phase and/or the amplitude, e.g. the presence of a plateau, allows a timing window to be defined. This timing window can be used to restrict the later search for an accurate synchronization reference. As described above the cross-correlation of CFO compensated samples provides an accurate information with respect to the synchronization reference, with high robustness with respect to the additive white Gaussian noise and channel effects. Combining the accurate timing information from the cross-correlation of LTS with the information extracted from the autocorrelation of the STS, i.e. a timing window and an early rough CFO estimation, is a solution in which the content of the training sequences is fully exploited. Using the accurate CFO estimation from the autocorrelation of the LTS requires extra buffering and is an option rather than a necessity.

Figure 16B:
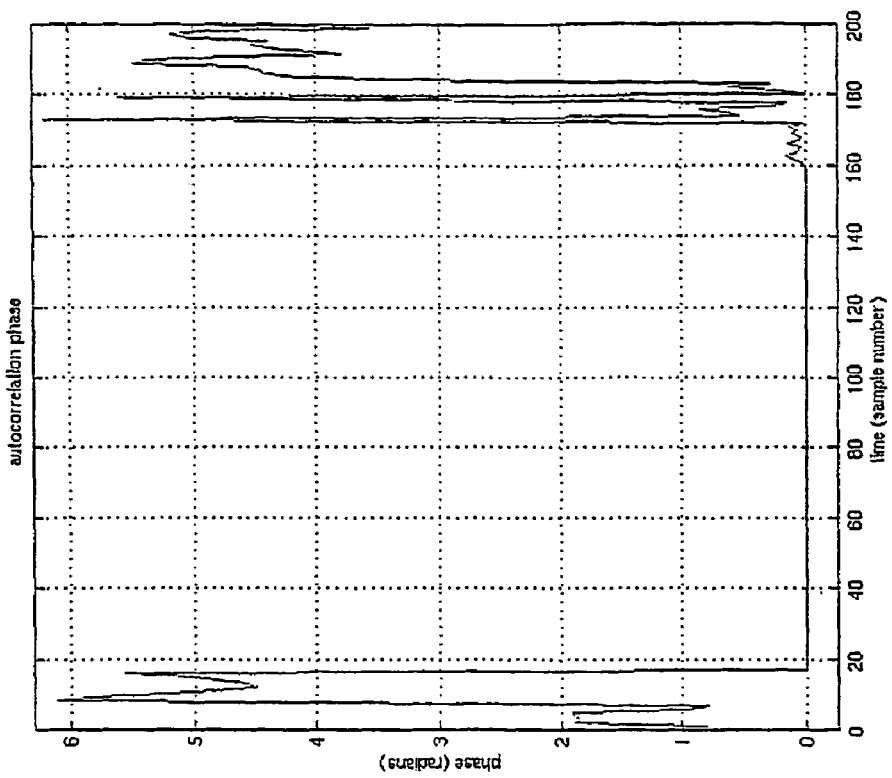
FIGS. 16a and 16b show the amplitude and phase (in radians) outputs of the autocorrelation unit of FIG. 4 when processing a preamble as shown in FIG. 2c with respect to sample number.
Figure 16A:
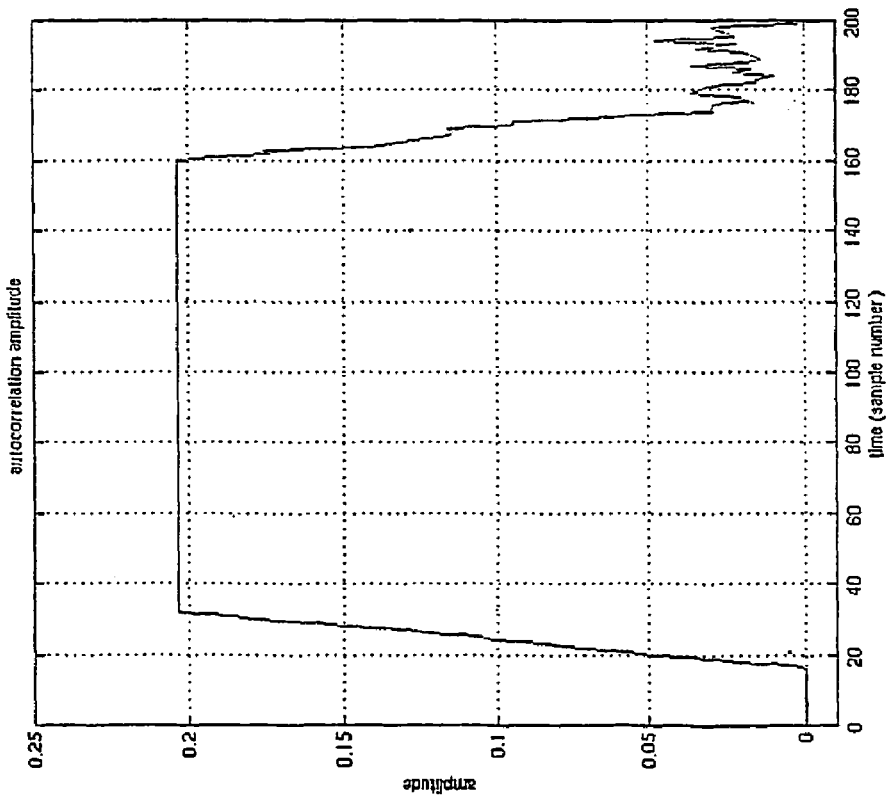
Figure 16D:
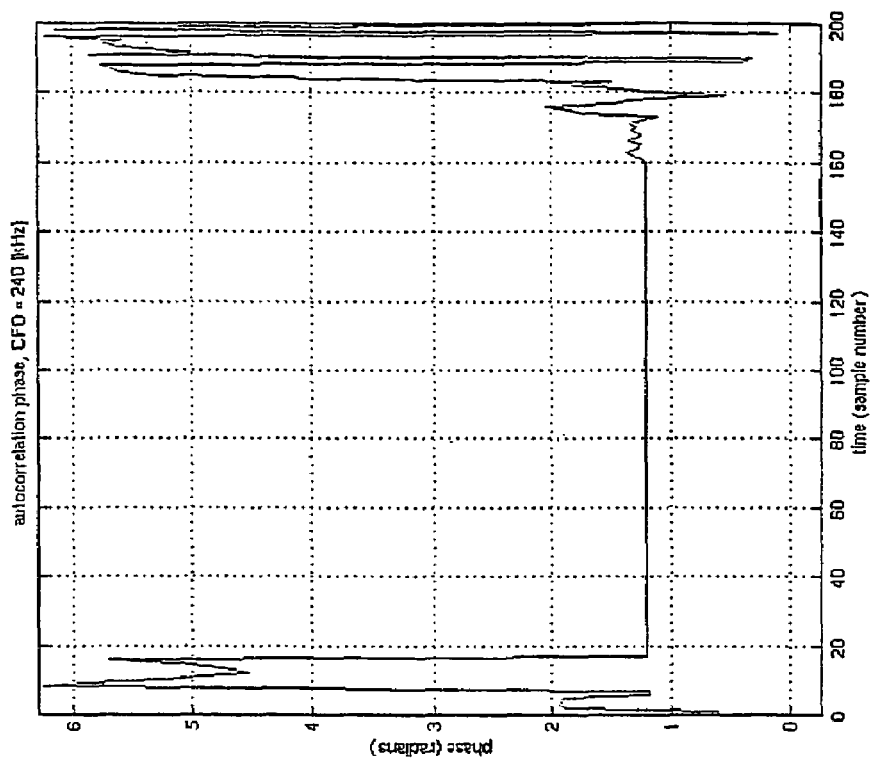
FIGS. 16c and 16d show the amplitude and phase (in radians) outputs of the autocorrelation unit of FIG. 4 when there is a CFO for the preamble of FIG. 2c.
Figure 16C:
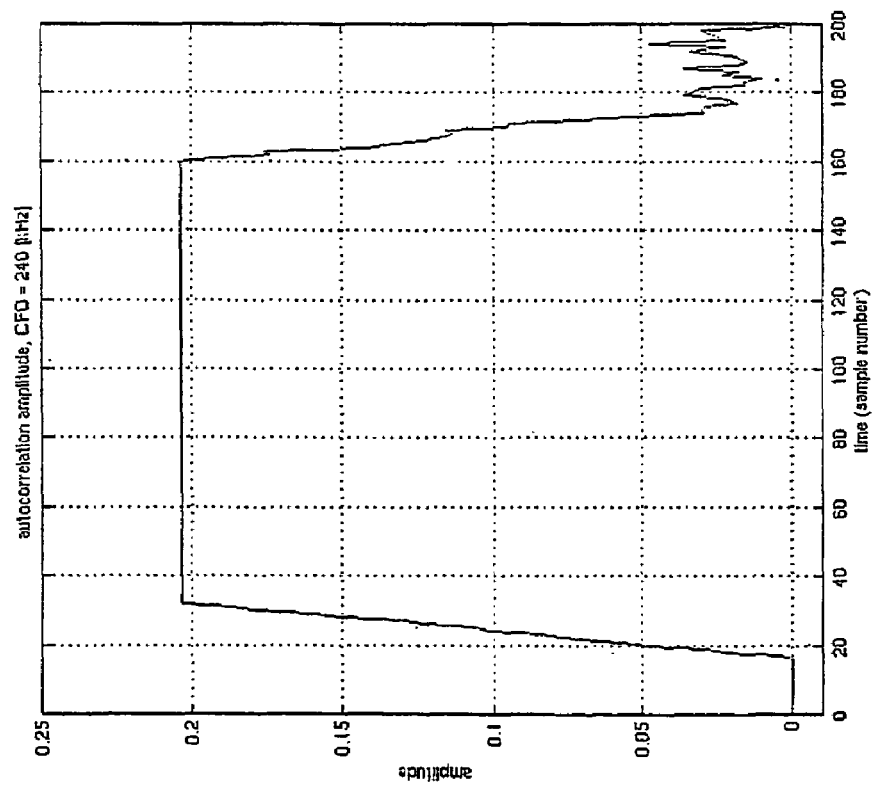

Regarding the autocorrelation, the parameters of the correlation are the correlation length L and the distance D between the correlated samples. The effect of CFO is a phase offset, as expected and shown by comparison of FIGS. 16b and 16d. The amplitude of this offset is proportional to the correlation distance. The amplitude of correlation (FIGS. 16a and 16c) is proportional to the correlation length. A bigger correlation length is desirable in order to have a reduced sensitivity to noise. However, the correlation distance should be bigger than the correlation length, and a bigger distance reduces the range of CFO which can be detected without phase ambiguity. The increased accuracy obtained with a longer distance comes at the cost of a reduced tolerance of the estimated CFO. It can be shown that the accuracy of the CFO estimate achieved with a 16 samples long autocorrelation is enough for the use of the estimated CFO to compensate adequately ready for the cross-correlation step. As the rough CFO estimation can be followed by an accurate one during the LTS, it is not necessary to go up to 32 samples. It should also be stressed that an increased correlation distance increases the risk of phase wraps under high CFO and noisy conditions, which dramatically affects the computed phase average and corrupts the estimated CFO.

The signatures shown in FIG. 16a-d can be recognized by identifying relevant characteristics of these waveforms. The main feature is a region of stable amplitude and phase values. The detection of such regions indicates the received samples are the short training symbols. When such stable plateaus end, the incoming samples correspond to the LTS. This provides a rough idea where to look for a more precise synchronization reference, i.e. a window can be derived form this information for use in later analysis of the received signals, e.g. at the time of the cross correlation.

Figure 17A:
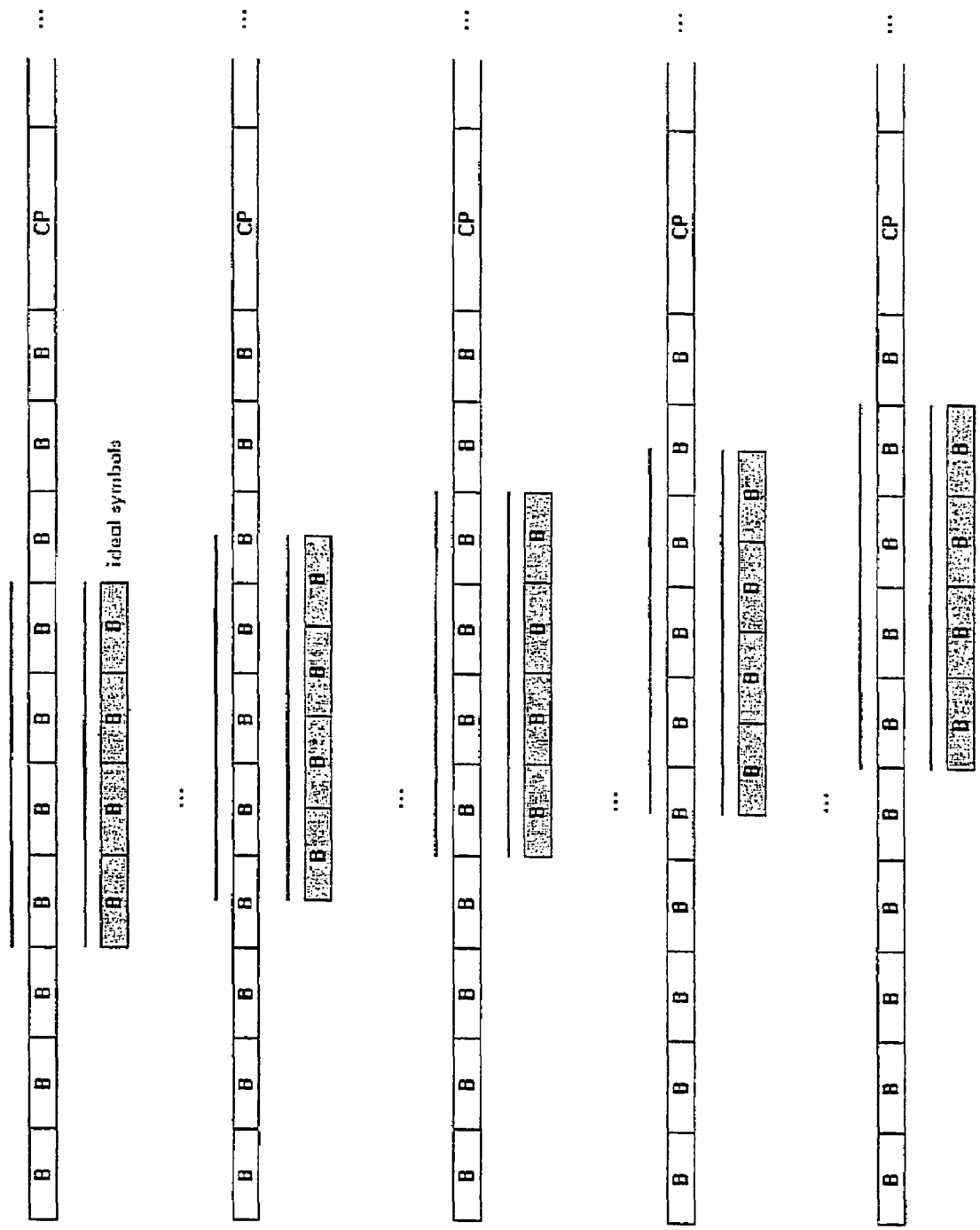
FIGS. 17a, 17b, 17c show various cross-correlation strategies in accordance with embodiments of the present invention.
Figure 17B:
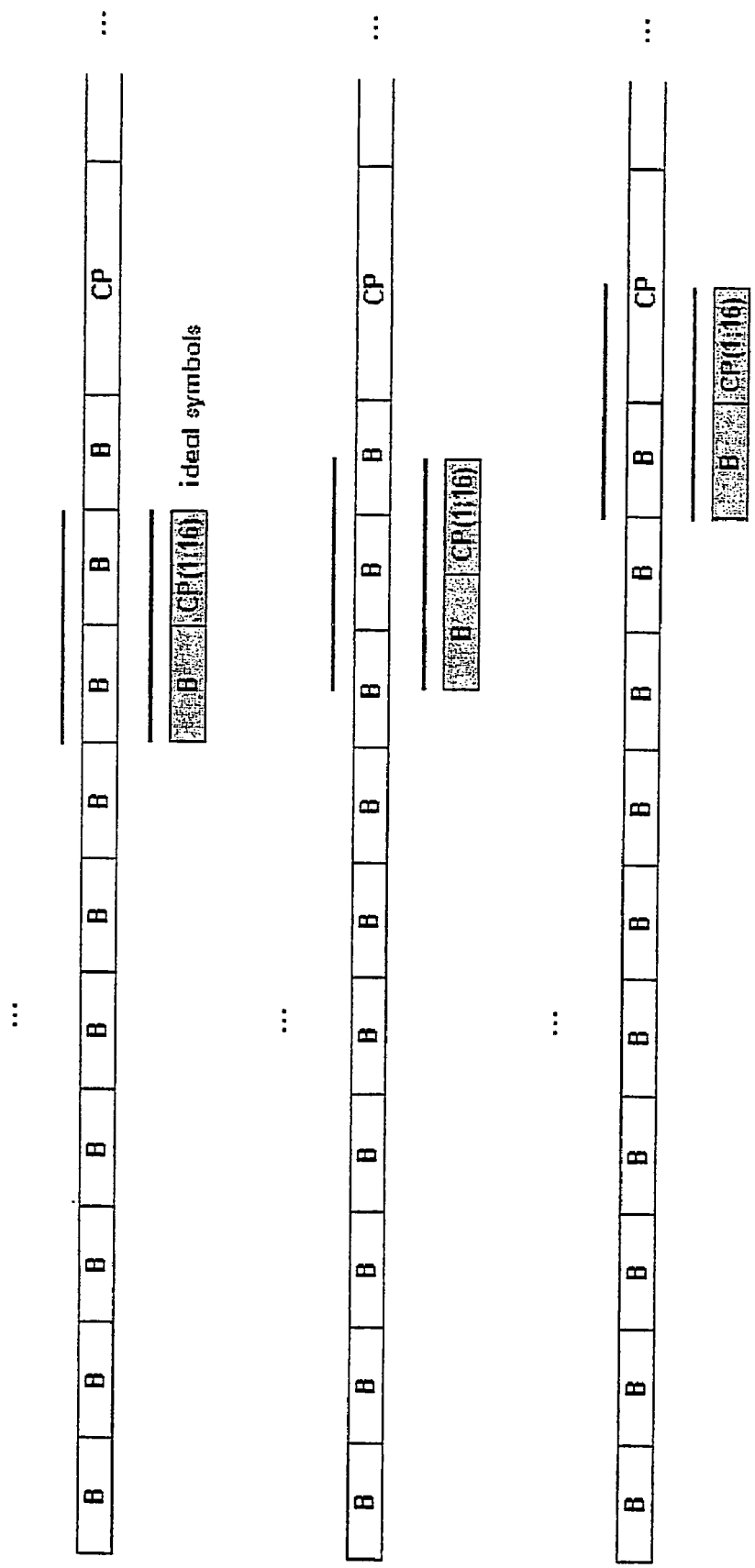
Figure 17C:
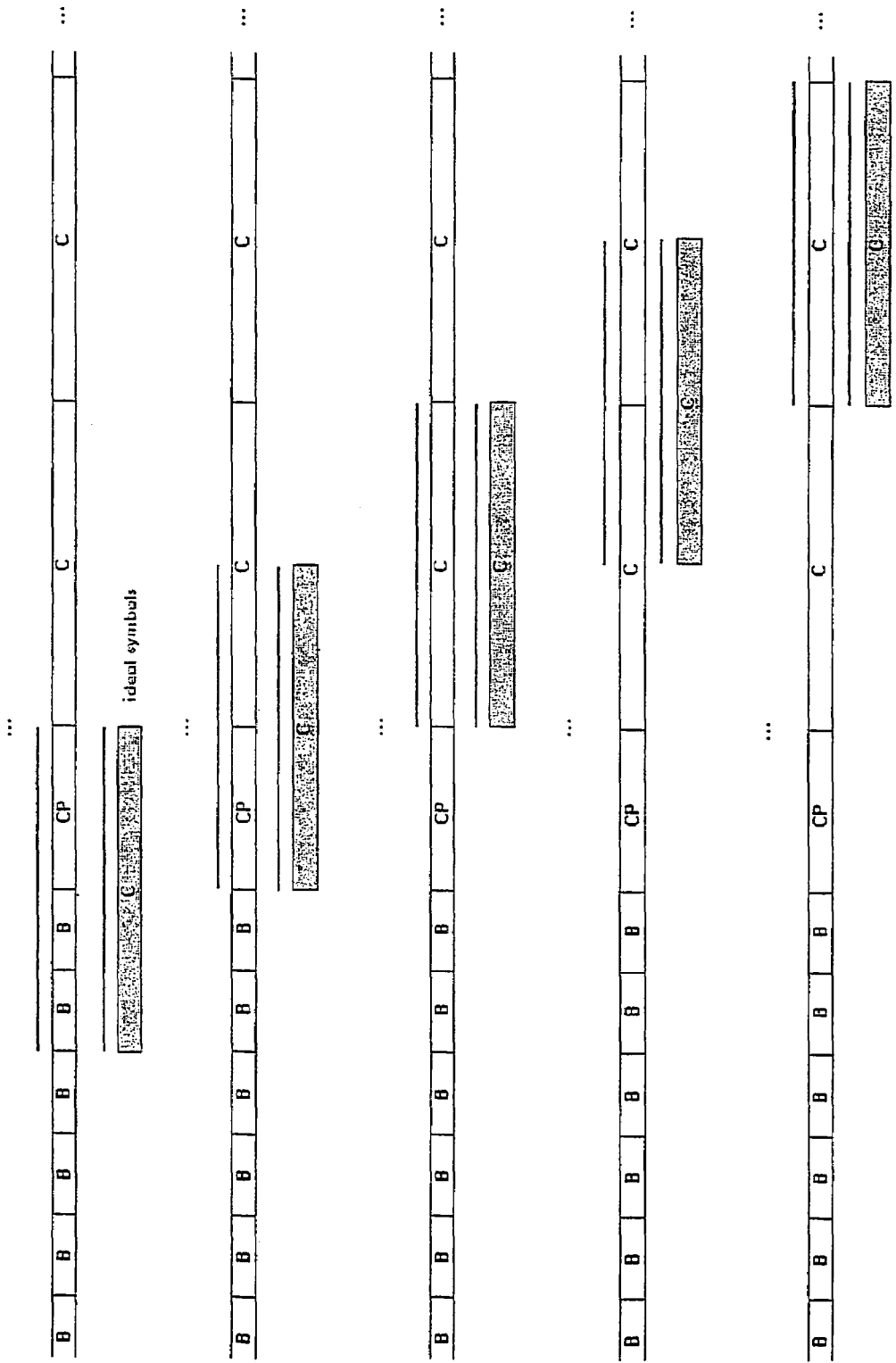
Figure 18A:
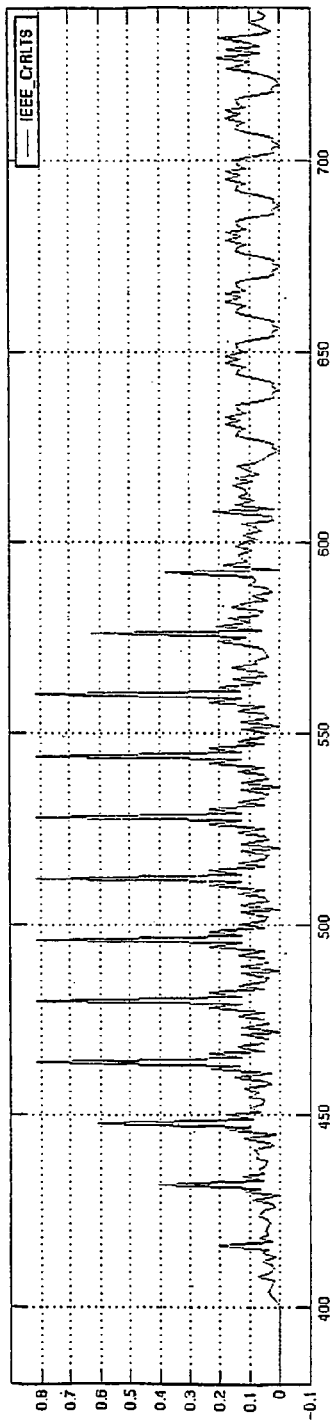
FIGS. 18a, 18b, 18c show the results of cross-correlation with the strategies of FIG. 17.
Figure 18B:
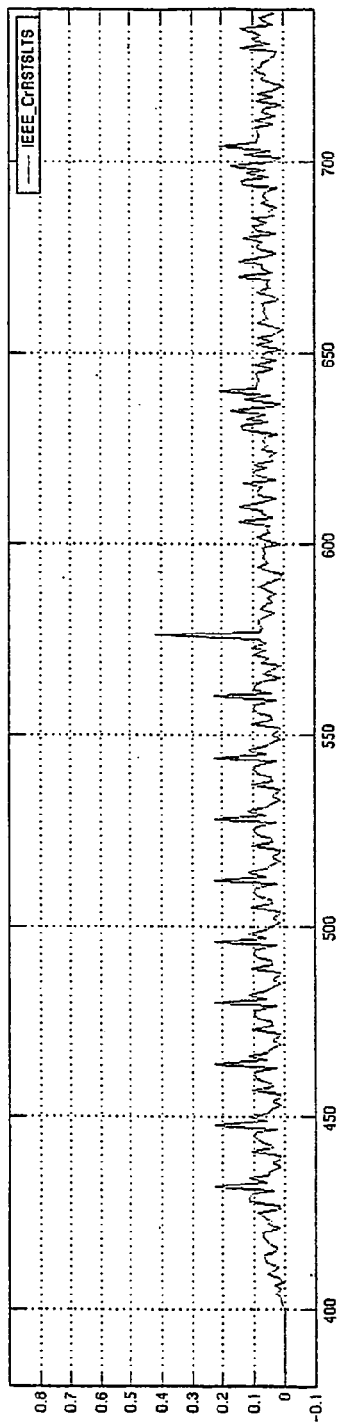
Figure 18C:
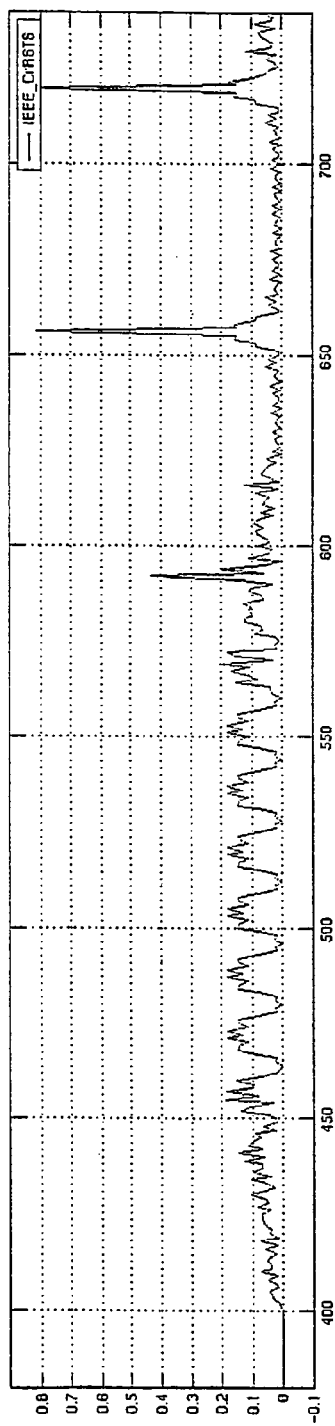

FIGS. 17a-c illustrate various cross-correlation patterns and lengths. The corresponding correlation amplitudes are shown in FIG. 18. Cross-correlation with the LTS the IEEE preamble of FIG. 2c gives different results than with the STS. The correlation amplitude obtained by cross correlating the received samples with the STS (FIG. 17a and FIG. 18a) is characterized by a succession of peaks separated by a distance equal to the length of the symbol, i.e. 16 samples. In the presence of a channel having many multipath components, delayed and attenuated copies of the peaks make it hard to detect the ones which must be detected, due to the first important tap of the channel impulse response. The second correlation pattern (FIG. 17b and FIG. 18b) is a better example, and is based not only on the STS but also part of the LTS. A correlation pattern which spans the STS and LTS creates a stronger correlation amplitude peak at the position where the pattern fully matches the received samples. The previous peaks, caused by the match between the samples and the STS part of the pattern, are lower. This is an improvement, but the sensitivity with respect to noise, channel and residual CFO, especially under extreme conditions where all these effects are present and important, can be improved still further. A good solution requires a cross-correlation with a pattern which is long enough and which produces amplitude peaks which are not close with respect to each other (ideally only one). This is the case when cross-correlating with a complete LTS, as shown in FIG. 17c and FIG. 18c. A first small peak, due to the cyclic prefix, remains negligible with respect to the two peaks which correspond to the two long training symbols. It is to preferred to detect the first peak. There is no reason to wait until the second peak if the first one can be found, except in case extra robustness would be desirable by identifying two peaks instead of one. As the plateaus of autocorrelation amplitude and/or phase have already been found and have been used to define a window, adequate security is obtained with determination of a single peak.

The detection of peaks may be done using thresholds as has been described with reference to FIG. 12. That is, it is not necessary to determine absolute peaks but two threshold values below the peak and on either side thereof may be used to determine the presence of the peak. By using threshold values below the absolute peak values, noise distortions at the actual peaks can be avoided. The threshold values may be selected dynamically to increase the speed of obtaining the cross-correlation. The adaptive threshold value may be calculated as a relative threshold with respect to the peak value.

The position of the window is provided by the information obtained with the autocorrelation, i.e., the end of the correlation plateau. The location of the window does not need to be accurate, the only requirement is that the peak is located within it. A longer window allows more margin for error. It is preferably not larger than the correlation distance, otherwise the window may contain at the same time both cross correlation amplitude peaks. The position of the peak within the window provides an accurate and precise synchronization reference. The detection of the peak can be done by finding the maximum and computing a relative threshold as described above for the ETSI preamble. The threshold values may be adjusted dynamically to improve synchronization.

Figure 8:
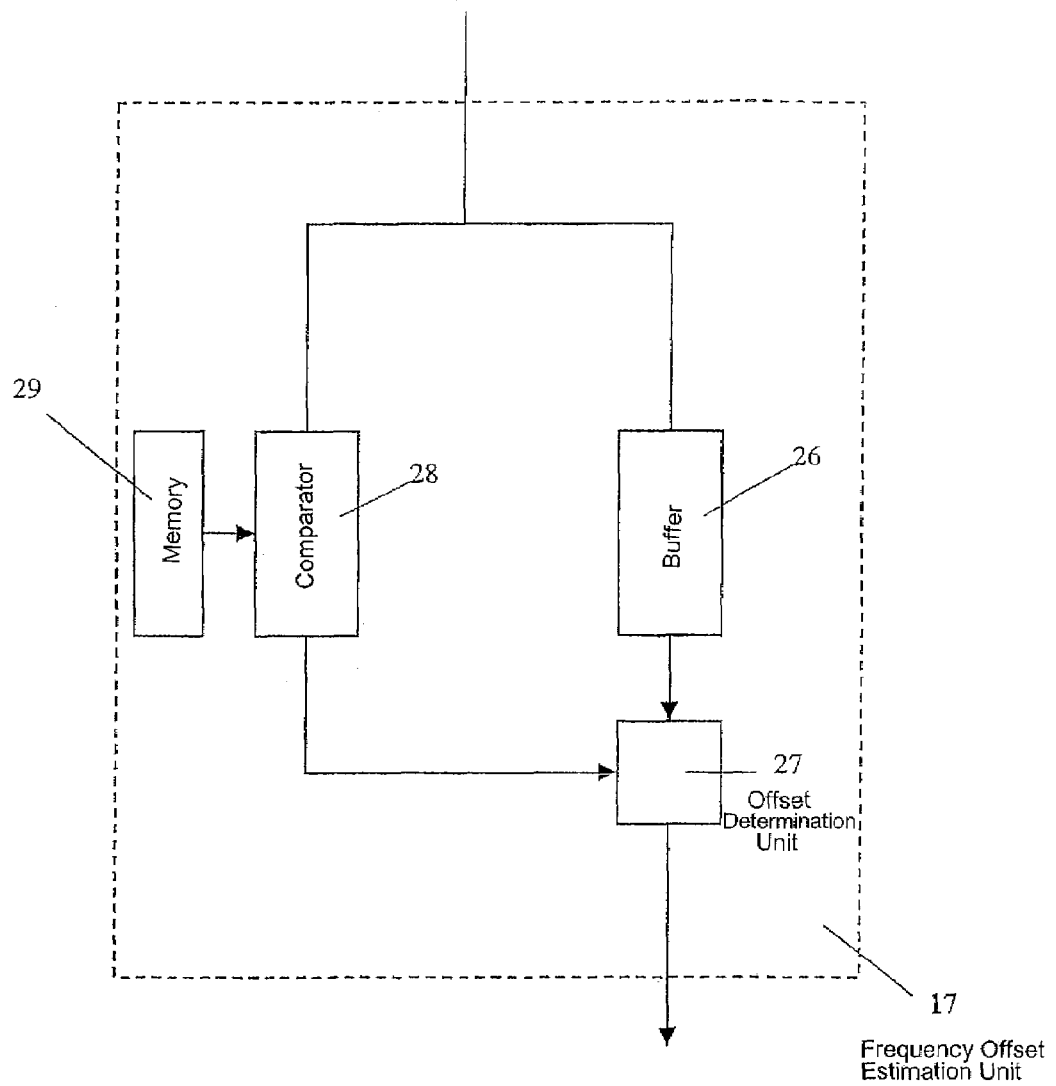
FIG. 8 is a schematic representation of a carrier frequency offset unit in accordance with an embodiment of the present invention.

FIG. 8 shows a schematic representation of a frequency offset estimation unit 17. The frequency offset unit 17 may include means to determine whether a signature of a known training sequence correlates with the received signal as well as means to determine from this identified portion of the received signal a frequency offset with respect to the carrier. The frequency offset unit may also include means to determine a sign of the CFO. The frequency offset unit includes means to determine a phase offset in a portion of the received signal which matches the signature. The frequency offset unit then calculates from this phase offset a frequency offset. The input is supplied from the phase correlation output of the autocorrelation unit 16. This input is fed to a buffer 26 and to optionally to a comparator 28 in parallel. The comparator 28 compares the received signal with a phase and/or amplitude signature input from a memory 29. The signature is based on the results of autocorrelation of the known training sequence (e.g. as shown in FIG. 5f). The comparator 28 outputs a logic high value when a high correlation level is achieved. The offset determination unit 27 calculates the phase shift (up or down in FIG. 5f) of a specific section of the input sequence from the buffer 26 based on the assumption that the input signal contains the signature and then converts this phase shift into a frequency offset. The offset frequency estimation unit only outputs the calculated value when a high logic signal is received from the comparator 28, i.e. when the signature has been detected in the received samples.

Figure 9A:
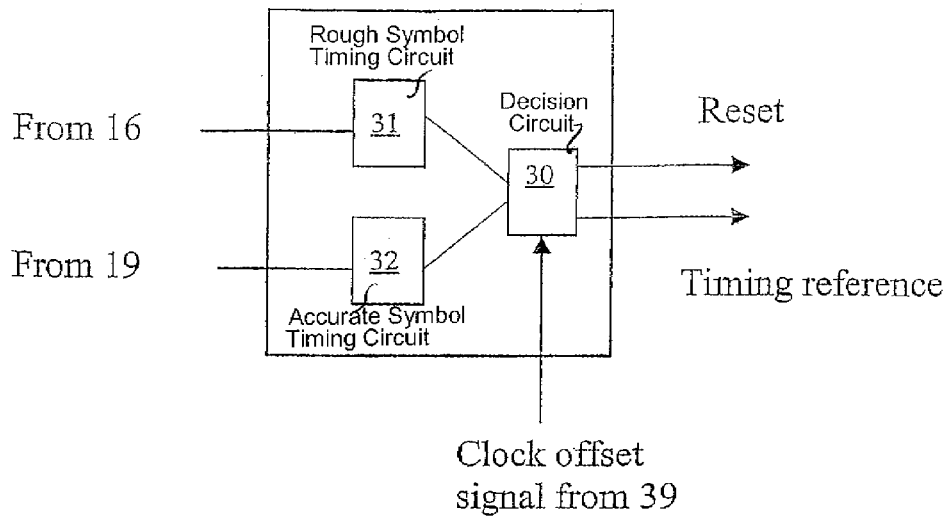
FIG. 9a is a schematic block diagram of a synchronization machine in accordance with an embodiment of the present invention.

FIG. 9a shows an overview of a synchronization unit 20 in accordance with an embodiment of the present invention. It comprises a rough symbol timing circuit 31, an accurate symbol timing circuit 32, a decision circuit 30. The output of the circuit is a timing reference indicative of synchronization.

Figure 9B:
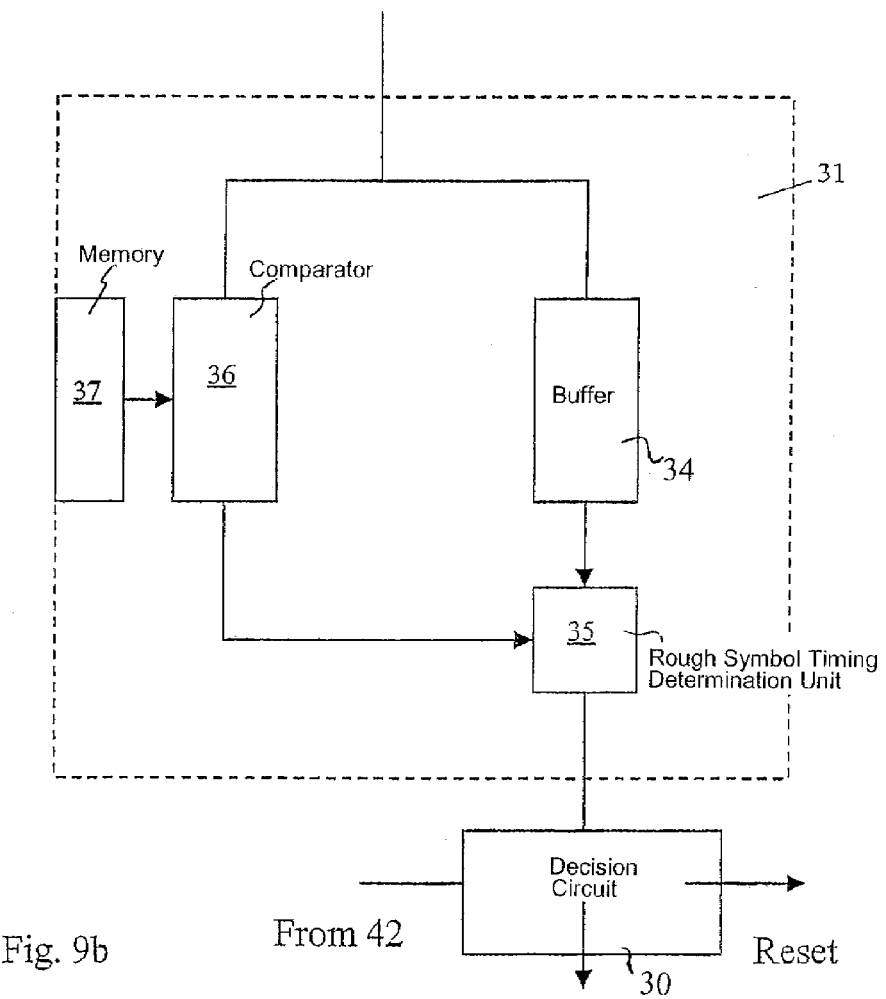
FIG. 9b is a schematic detailed representation of a symbol timing determining unit in accordance with an embodiment of the present invention.

A rough symbol timing circuit 31 is shown schematically in FIG. 9b. Circuit 31 includes means to determine a symbol timing from an identified portion of the received signal and to output the symbol timing. It may also include means to determine whether a signature of a known training sequence correlates with the received signal. Either phase or amplitude outputs may be used, but the discussion below will be limited to amplitude. The amplitude signal from the correlation unit 16 is optionally fed in parallel to a buffer 34 and a comparator 36. The buffer 34 is configured to delay the signal by the length of the known training sequence. The optional comparator 36 compares the received signal with a stored signal from a memory 37 of the amplitude signature generated by the training sequence when processed in the autocorrelation unit 16 (e.g. a curve as shown in FIG. 5e). The comparator 36 compares the two and outputs a high logic signal when the correlation is high. This is fed to the rough symbol timing determination circuit 35 which may be configured as a peak and/or trough detector and determines a symbol timing from a predetermined position or positions in the signal under the assumption that it is processing a signature sequence, i.e., one correlated with the known sequence. The input from the circuit 36 is used to confirm that the synchronization has been obtained and/or to reduce the window which has to be searched. Various techniques are known to the skilled person for determining peaks and/or troughs. When it determines such a peak and/or trough it outputs a logic high signal to the decision circuit 30.

Figure 9C:
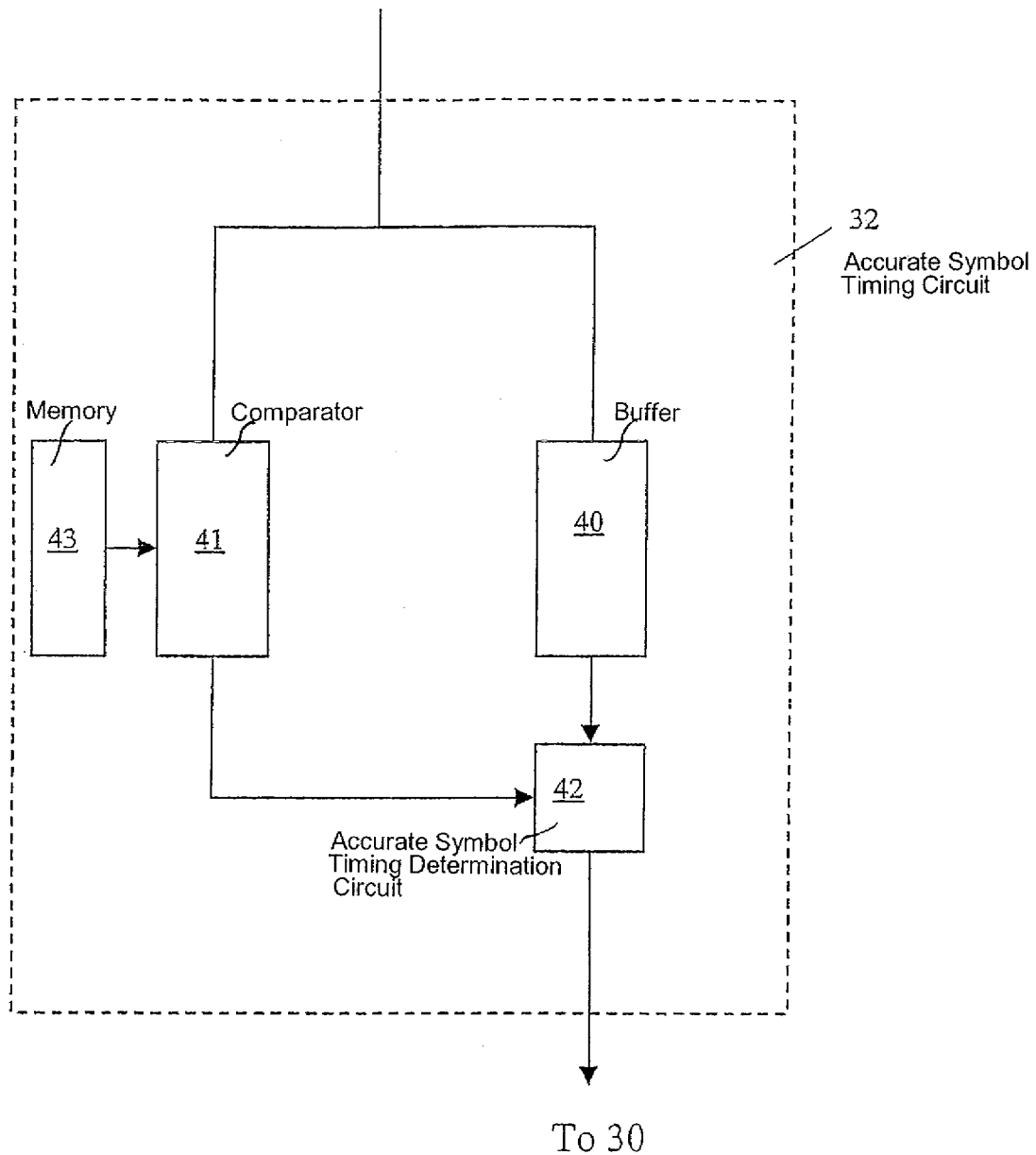
FIG. 9c is a schematic detailed representation of a further symbol timing determining unit in accordance with an embodiment of the present invention.

FIG. 9c is a schematic representation of an accurate symbol timing circuit 32. The circuit 32 includes means to determine from an identified portion of the received signal an accurate symbol timing. The circuit may optionally include means to determine whether a signature of a known training sequence correlates with the received signal. The amplitude output from the adder 25 of the cross-correlator unit 19 is the input to this circuit. The input is optionally fed in parallel to a buffer 40 and a comparator 41. The buffer 40 delays the signal by one training sequence length. The optional comparator 41 compares the received signal with a signature of the amplitude signal from the known training sequence as output by the cross-correlator unit 19 (e. g. as in FIG. 7). The known signature is obtained from a memory 43. The comparator 41 compares the two and determines when correlation exists. The comparator 41 then sends a high logic signal to the accurate symbol timing determination circuit 42. The input from the comparator 41 is used to confirm that the synchronization has been obtained and/or to reduce the window which has to be searched. Instead of using this signal the timing reference signal output from the synchronization machine 20 could be used to identify where circuit 42 is to search. The circuit 42 may be configured as a peak detector and determines a symbol timing from a predetermined position in the signal under the assumption that it is processing a signature sequence. When it determines such a peak it outputs a logic high signal to the decision circuit 30.

The decision circuit 30 outputs a symbol timing signal based on the following logic. When there is only a signal from circuit 35 this is taken as the symbol timing, that is it is the timing reference output. When there is a signal from both of the circuits 35 and 42 the decision circuit 30 can in one embodiment only select the signal from circuit 42 (assumed more accurate). In an alternative embodiment, the decision circuit compares the two signals from the circuits 35 and 42. If they differ by a threshold time value the decision circuit 30 assumes an error has occurred and outputs a reset signal which resets the process of rough and accurate synchronization timing determination. If the time difference between the two signals is below the threshold it is assumed that no error has occurred and the timing signal from circuit 42 is output as the symbol timing.

After acquisition and synchronization of the received signal, the correlation unit 16 mentioned above can be used but need not be used for tracking during the data stream and for determining clock offsets. This can be done by autocorrelation of the cyclic prefix of each symbol. However, this method is not accurate due to channel effects and intersymbol interference. Instead, in accordance with an embodiment of the present invention, the rotation of the constellation points in the received signal is determined in the frequency domain which is caused by the misalignment between the clocks of the transmitter and receiver. As shown in FIG. 3 a constellation point rotation unit 39 outputs a value related to the rotation of the constellation points in the received signal to the synchronization machine 20. Referring to FIG. 9a, based on this value the decision circuit 30 outputs a signal for corrective action, e. g. one sample is skipped or duplicated in the time domain (received signal) if necessary.

Figure 15:
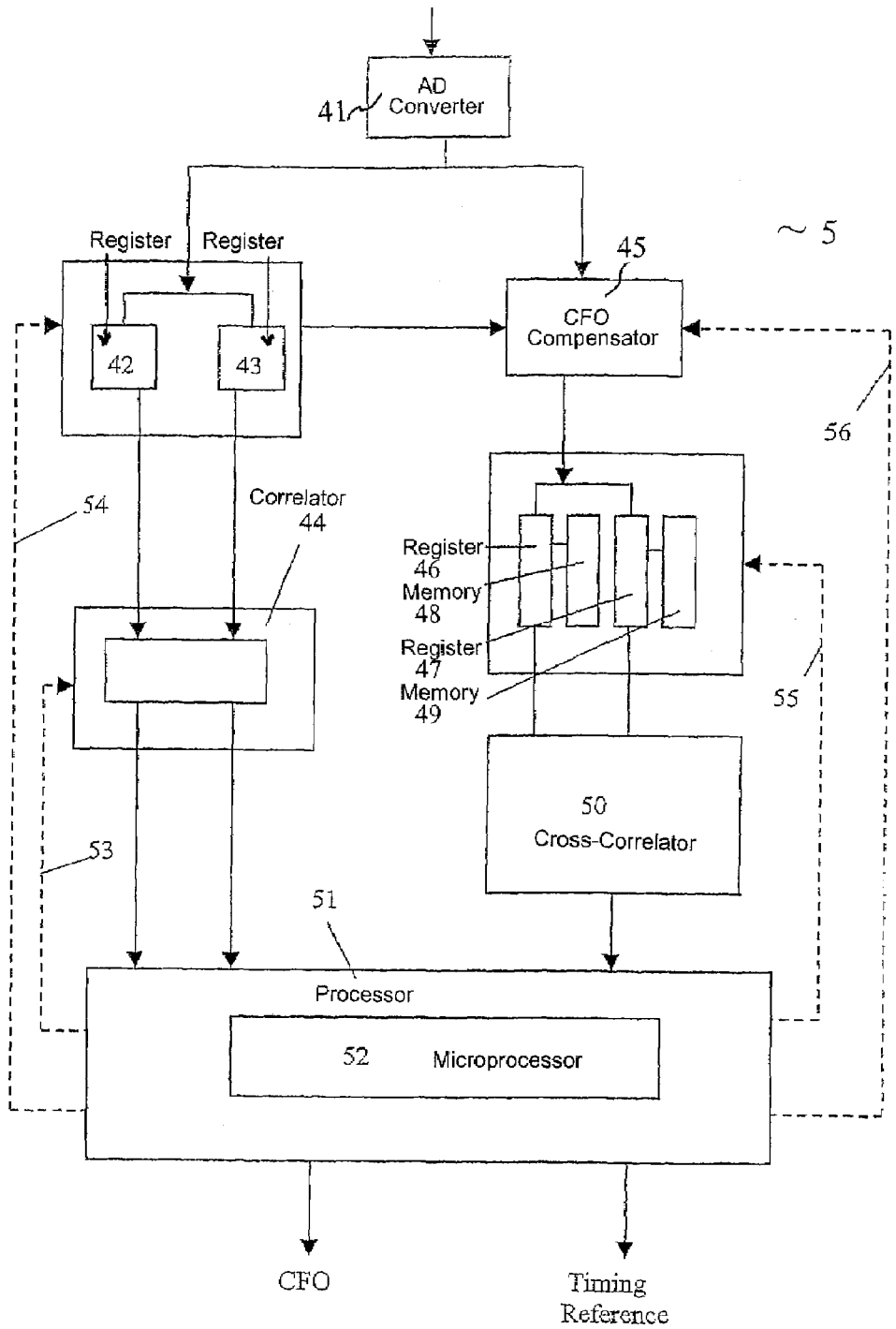
FIG. 15 shows an embodiment of a hardware/software embodiment of a timing reference unit in accordance with an embodiment of the present invention.

A practical implementation of a timing reference unit 5 is shown in FIG. 15. In order to have a flexible solution, which does not depend on standard used, e.g. the ETSI or IEEE standard, the architecture is based on two main parts:

1) A hardware (HW) part (41-50), computing useful information required by the following tasks
2) A dedicated processor unit (51), taking the values given by the HW part as inputs for the programs performing the relevant tasks whereby the processor can change the configuration of the blocks in the HW part (e.g. parameters like the correlation length and/or distance).

The received samples are supplied from an AD converter 41. The synchronization and the estimation of CFO make use of the correlation between successive received samples ("sliding" autocorrelation) or between the received samples and the expected pattern (cross correlation). Depending on the situation, the received samples can be compensated by a time domain rotor, in order to cancel the effect of CFO. Average amplitude and phase values may be computed, as well as information with a higher level of content (e.g. detection of the cross-correlation peaks) which relieves the processor of some tasks. The dedicated processor unit may comprise more than one microprocessor which could work in parallel or in pipeline. The processor unit is also used to configure the blocks of the HW part, e.g. the correlators, the rotors etc. have parameters which change depending on the environment, e.g. the value of CFO or the task, e.g. synchronization and CFO estimations use correlations of different lengths. The received samples need not be modified by the unit 5, e.g. they are forwarded transparently.

The samples from the ADC 41 are supplied to a first shift register unit. The shift register unit has two identical internal shifter registers 42, 43 which are each used to store one of the two sets of incoming complex samples for autocorrelation. Depending on a first configuration input 54, relevant samples are supplied to a CFO compensation unit 45. The configuration input 54 is supplied from the processor unit 51. A correlator 44 performs a sliding correlation calculation from two arrays of input samples (in complex form) from the shift register unit.

Figure 11C:
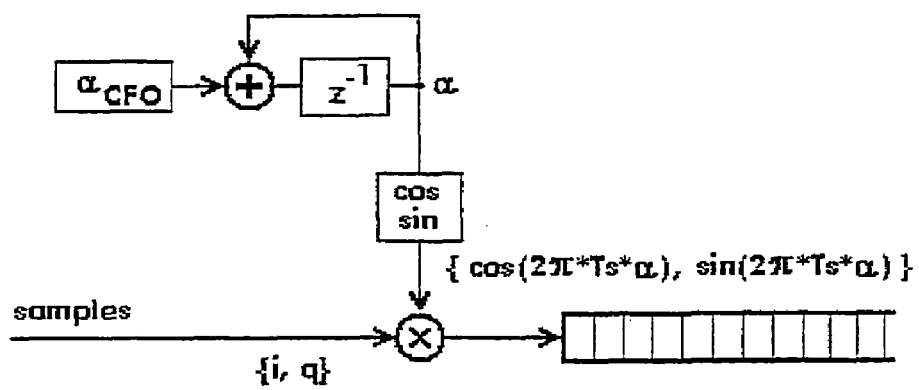
FIG. 11c shows a time domain rotor.

CFO compensator unit 45 is a time-domain rotor (illustrated in FIG. 11c), which compensates the input samples with an accumulated CFO angle and passes these to a second shift register unit which has two internal shifter registers 46, 47 to store input samples in complex form and memories 48, 49 to store the relevant pattern in complex form of the known training sequence, respectively for comparison purposes. The unit 45 produces two arrays of samples for the cross-correlator 50 according to the configured preamble type. Those two arrays of samples are extracted from the sample registers 46, 47 respectively. If necessary the second shift register unit can receive the samples from the input samples directly. The operation of the second shift register unit is configured by the processor unit 51 via configuration signal 55. Cross-correlator 50 correlates the samples with the known pattern.

The processor unit 51 comprises at least one microprocessor 52. The processor 52 first looks for a plateau in the amplitude signal coming from unit 44 (autocorrelated STS for all preambles of FIG. 2). The processor 52 searches for the end of the desired plateau. For example, for the preamble of FIG. 2b the processor 52 searches for a point where the distance between the positions of the minimum and the maximum in the sliding correlation shift register is in between redefined numbers dependent upon the relevant standard. Then, the processor 52 calculates a relative upper and a lower threshold using the maximum and the minimum values of the sliding correlation amplitude. These threshold values may be adapted dynamically to improve synchronisation-synchronization. Using these threshold values, it searches for the first sample where the sliding correlation amplitude is less than the upper threshold and at a previous point within the relevant distance, the correlation amplitude is greater than the lower threshold. The distance between these points is configurable by the processor 52. The peak of the correlation is the end of the STS. Now, the processor 52 checks for the phase jump of $\pi$ (pi) between the current point and a previous point within a predefined distance in the phase signal from unit 44. The correlation phase is represented by two values having a phase offset in between, which is also configurable by the processor 52.

For other preambles, the processor determines the end of the plateau by any other suitable means.

Processor 52 then determines certain information from the autocorrelated output from unit 44. For example, for the preamble of FIG. 2c the sign of the CFO is determined from the magnitude of the shifting of the phase curve in the correlated samples from unit 44. Alternatively, a rough CFO estimate is first obtained from the magnitude of shifting of the phase curve in the correlated samples from unit 44. The accurate CFO is estimated as the average of the correlation phase of the LTS over 64 samples as received from the unit 44 when it is processing the LTS. The processor 52 knows when the STS has been identified and sends a configuration signal 53 to the correlator unit 44 to reconfigure for a different correlation, e.g. a 32 sample correlation. By examining the sign of the CFO or the rough CFO estimate (if available) obtained from the STS, the processor 52 decides which phase representation to use (0-2 pi or −pi to +pi) to take care of the phase wraps. At the end of the additions, the result is divided by 64, but which division has been made in the right direction is confirmed by looking at the magnitude of the rough CFO estimate. The CFO estimate available at any time, i.e. either rough or accurate, is provided to the CFO estimator 45 via the configuration signal 56.

The accurate symbol timing is obtained from the cross-correlation of the CFO compensated samples with a known training sequence available from unit 50. The processor searches for a particular waveform in this output depending upon the training sequence involved, e. g. searches for a large peak in this output. To localize this peak the rough synchronization from the STS can be used to provide a window. The timing reference either rough or accurate is an output of the processor unit 51. The cross-correlation can be done with a suitable known sequence, e. g. the STS or the LTS or both of the preambles of FIG. 2.

The above receiver may be configured to be a multimode receiver, i.e., it can receive and process any of the preambles of FIG. 2. To achieve this the processor 52 makes use of the configuration signals 53-56 to set the synchronization unit to the appropriate algorithm.

The present invention also includes software computer programs which contain code which when executed on a processing means to carry out one or more of the methods of the invention. The software may include code for processing a received signal comprising a carrier modulated with a known training sequence, comprising: code of obtaining an estimate of a carrier frequency offset from an autocorrelation signal obtained by autocorrelation of the part of the received signal containing a known training sequence; code for compensating the received signal with the obtained estimate of the frequency offset to form a compensated received signal, and code for obtaining a timing reference for the received signal by cross-correlation of the compensated received signal with a known training sequence. The software code for the auto-correlation step may comprise code for detecting a characteristic curve in the amplitude of the autocorrelation signal indicative of a training sequence. The code for the autocorrelation step may also comprise code for detecting a characteristic curve in the phase of the autocorrelation signal indicative of the training sequence. The software may also comprise code for determining a phase shift in the autocorrelation signal. The software may also comprise code for determining the carrier frequency offset from the phase shift. The software may also comprise code for determining a characteristic curve indicative of the training sequence in the amplitude of the cross-correlation of the compensated received signal with the known training sequence. The software may also comprise code for outputting the timing reference for the received signal obtained by autocorrelation of the received signal if the timing reference obtained by cross-correlation of the compensated received signal with the known training sequence is not present. The software may also comprise code for otherwise outputting the timing reference determined by cross-correlation of the compensated received signal with the known training sequence. The software may also comprise code for comparing the timing reference for the received signal obtained by cross-correlation of the compensated received signal with the known training sequence when present and the timing reference determined by autocorrelation of the received signal, and for outputting a reset signal if the two timing references differ by more than a threshold value and otherwise outputting the timing reference for the received signal obtained by cross-correlation of the compensated received signal with the known training sequence. The present invention also includes data carriers storing any of the above computer programs. The data carriers are preferably machine readable and execute a method according to the invention when loaded on a computing device. For example, the above software programs may be stored on any suitable data carrier such as CD-ROMs, diskettes, magnetic tape or may be included in the memory of a computer or of a network element.

The skilled person will appreciate certain aspects of the present invention from the above. Firstly, autocorrelation is preformed on the received signal to obtain an estimation of the CFO. This may be done as a single step process or as a two step process, e.g. first obtain a sign of the CFO from autocorrelation of the STS followed by autocorrelation of the LTS to obtain the CFO estimate. This estimate is used to compensate the received signals for CFO. These compensated signals are then subject to cross-correlation to obtain an accurate value of the timing.

The present invention may find advantageous use in receivers for telecommunications systems, especially for wireless communication systems and particularly for OFDM systems such as Local Area Networks (LAN). The present invention allows an accurate and robust synchronization which is essential for operation at high bit rates and which can provide better bit error rate and improved quality of communication.

While the invention has been shown and described with reference to preferred embodiments, it will be understood by those skilled in the art that various changes or modifications in form and detail may be made without departing from the scope and spirit of this invention.

What is claimed is:

1. A receiver for receiving a signal comprising a modulated carrier, with a frame having a first and second training sequences, comprising:
a frequency offset estimation unit for receiving the signal and obtaining initial information relating to a carrier frequency offset from a first autocorrelation signal obtained by autocorrelation of the first training sequence of the received signal and for obtaining an estimate of the carrier frequency offset from the initial information and a second autocorrelation signal obtained by autocorrelation of the second training sequence of the received signal, wherein:
the initial information comprises a sign of the carrier frequency offset,
the second training sequence is longer than the first training sequence, and
the autocorrelation of the second training sequence uses more samples than the autocorrelation of the first training sequence;
a frequency offset compensation unit for compensating the received signal with the estimate of the frequency offset obtained from the frequency offset estimation unit to form a compensated received signal, and
a time reference determining unit for obtaining a timing reference for the received signal by cross-correlation of the compensated received signal with a third training sequence.

2. The receiver according to claim 1, wherein the time reference determining unit is adapted to obtain a first timing reference for the received signal by autocorrelation of the received signal and a second timing reference for the received signal by the cross-correlation of the compensated received signal with the third training sequence.

3. The receiver according to claim 1, wherein the frequency offset estimation unit comprises means for determining a phase shift in at least one of the first and second autocorrelation signals.

4. The receiver according to claim 1, wherein the receiver comprises means to detect a characteristic curve indicative of the third training sequence in a phase of at least one of the first and second autocorrelation signals.

5. The receiver according to claim 1, wherein the receiver comprises means to detect a characteristic curve indicative of the third training sequence in an amplitude of at least one of the first and second autocorrelation signals.

6. The receiver according to claim 4, wherein the characteristic curve includes peaks and/or troughs and threshold values are used to detect the peaks and troughs.

7. The receiver according to claim 6, wherein the threshold values are set dynamically.

8. The receiver according to claim 5, wherein the characteristic curve includes peaks and/or troughs and threshold values are used to detect the peaks and troughs.

9. The receiver according to claim 8, wherein the threshold values are set dynamically.

10. The receiver according to claim 3, wherein the frequency offset estimation unit comprises means for determining the estimate of the carrier frequency offset from the phase shift.

11. The receiver according to claim 1, wherein the receiver comprises means to determine the sign of the carrier frequency offset from a phase of the first autocorrelation signal.

12. The receiver according to claim 11, wherein the receiver has means for determining a phase shift in the second autocorrelation.

13. The receiver according to claim 1, wherein the time reference determining unit comprises means to determine a characteristic curve indicative of a fourth training sequence in an amplitude of at least one of the first and second autocorrelation signal.

14. The receiver according to claim 1, wherein the time reference determining unit comprises means to determine a characteristic curve indicative of a fourth training sequence in a phase of at least one of the first and second autocorrelation signals.

15. The receiver according to claim 1, wherein the time reference determining unit comprises means to determine a characteristic curve indicative of a fourth training sequence in an amplitude of the cross-correlation of the compensated received sequence with a third training sequence.

16. The receiver according to claim 15, wherein the characteristic curve includes peaks and/or troughs and threshold values are used to detect the peaks and troughs.

17. The receiver according to claim 16, wherein the threshold values are set dynamically.

18. The receiver according to claim 1, wherein the receiver is adapted to output a timing reference obtained from the received signal by autocorrelation of the received signal if the timing reference obtained by cross-correlation of the compensated received signal with the third training sequence is not present.

19. The receiver according to claim 18, wherein the receiver is adapted to otherwise output the timing reference determined by cross-correlation of the received signal.

20. The receiver according to claim 18, wherein the receiver is adapted to compare the timing reference for the received signal obtained by cross-correlation of the compensated received signal with the third training sequence when present and the timing reference determined by autocorrelation of the received signal, and to output a reset signal if the two timing references differ by more than a threshold value and otherwise to output the timing reference for the received signal obtained by cross-correlation of the compensated received signal with the third training sequence.

21. The receiver according to claim 1, wherein the timing reference determining unit is adapted to determine a symbol timing from a correlation peak in the cross-correlation of the received signal with the third training sequence.

22. The receiver according to claim 1, wherein the received signal includes a cyclic prefix, the receiver further comprising: means for obtaining an accurate value for the carrier frequency offset by autocorrelation of the cyclic prefix with the received signal.

23. An OFDM telecommunications system including the receiver according to claim 1.

24. A method for processing a received signal comprising a modulated carrier having a frame with a first and second training sequences, comprising:

obtaining initial information relating to a carrier frequency offset from a first autocorrelation signal obtained by autocorrelation of the first training sequence of the received signal, wherein:

the initial information comprises a sign of the carrier frequency offset, the second training sequence is longer than the first training sequence, and the autocorrelation of the second training sequence uses more samples than the autocorrelation of the first training sequence;

obtaining an estimate of the carrier frequency offset from the initial information and a second autocorrelation signal obtained by autocorrelation of the second training sequence of the received signal;

compensating the received signal with the obtained estimate of the frequency offset to form a compensated received signal, and obtaining a timing reference for the received signal by cross-correlation of the compensated received signal with a third training sequence.

\* \* \* \* \*

UNITED STATES PATENT AND TRADEMARK OFFICE
CERTIFICATE OF CORRECTION

PATENT NO. : 7,424,067 B2  Page 1 of 1
APPLICATION NO. : 10/532155
DATED : September 9, 2008
INVENTOR(S) : Yves Vanderperren et al.

It is certified that error appears in the above-identified patent and that said Letters Patent is hereby corrected as shown below:

Title Page
Item (75) should read:
(75) Inventors: Yves Vanderperren, Brussels (BE),
Wim Dehaene, Kessel-Lo (BE)

Col. 10, lines 12-13 should read:
This correlation can be computed using the same autocorrelator Col. 11, line 51 should read:
in FIG. 5f is used to determine synchronization. In the second Col. 17, lines 64-65 should read:
adapted dynamically to improve synchronization. Using these threshold values, it searches for the first Col. 20, line 12 Claim 1 should read:
received signal with the estimate of the carrier frequency offset Col. 22, line 27 Claim 24 should read:
mate of the carrier frequency offset to form a compensated Signed and Sealed this Fourth Day of November, 2008

JON W. DUDAS
*Director of the United States Patent and Trademark Office*